(12) United States Patent
Marien

(10) Patent No.: US 8,966,268 B2
(45) Date of Patent: Feb. 24, 2015

(54) STRONG AUTHENTICATION TOKEN WITH VISUAL OUTPUT OF PKI SIGNATURES

(71) Applicant: Vasco Data Security, Inc., Oakbrook Terrace, IL (US)

(72) Inventor: Dirk Marien, Ranst (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 0 days.

(21) Appl. No.: 13/728,310

(22) Filed: Dec. 27, 2012

(65) Prior Publication Data

US 2013/0198519 A1    Aug. 1, 2013

Related U.S. Application Data

(60) Provisional application No. 61/581,897, filed on Dec. 30, 2011.

(51) Int. Cl.
*H04L 29/06* (2006.01)
*H04L 9/32* (2006.01)
(Continued)

(52) U.S. Cl.
CPC .............. *H04L 9/3234* (2013.01); *G06F 21/34* (2013.01); *H04L 63/0838* (2013.01);
(Continued)

(58) Field of Classification Search
CPC ........ G06F 21/34; G06F 21/36; H04L 9/3234
USPC ........................................................ 713/172
See application file for complete search history.

(56) References Cited

U.S. PATENT DOCUMENTS

| 5,136,644 A | 8/1992 | Audebert et al. |
| 2002/0083327 A1* | 6/2002 | Rajasekaran et al. ......... 713/182 |

(Continued)

FOREIGN PATENT DOCUMENTS

| EP | 1 102 205 | 5/2001 |
| EP | 1 211 841 | 6/2002 |

(Continued)

OTHER PUBLICATIONS

Kao, Yung-Wei, et al. "Physical access control based on QR code." Cyber-enabled distributed computing and knowledge discovery (CyberC), 2011 International Conference on. IEEE, 2011.*

(Continued)

*Primary Examiner* — Kambiz Zand
*Assistant Examiner* — Michael Guirguis
(74) *Attorney, Agent, or Firm* — RatnerPrestia

(57) ABSTRACT

A handheld authentication device comprising a data processor and a display is adapted to: generate an input value; submit the input value to an asymmetric cryptographic operation; obtain the result of said asymmetric cryptographic operation; generate an authentication message substantially comprising the result of the asymmetric cryptographic operation; encode the authentication message into one or more images; and display these images on the display. A method for securing computer-based applications remotely accessed by a user comprises capturing images displayed on the display of an authentication device of the user whereby these images have been encoded with an authentication message generated by the authentication device and whereby the authentication message comprises the result of an asymmetric cryptographic operation on an input value; decoding the images to retrieve the authentication message; retrieving the result of the asymmetric cryptographic operation from the authentication message; verifying the authentication message.

36 Claims, 5 Drawing Sheets

(51) Int. Cl.
  *G06F 21/34*    (2013.01)
  *H04L 9/00*     (2006.01)
  *G06F 21/33*    (2013.01)

(52) U.S. Cl.
  CPC ......... *H04L 63/0853* (2013.01); *H04L 63/126* (2013.01); *H04L 63/18* (2013.01); *H04L 9/3244* (2013.01); *H04L 9/006* (2013.01); *H04L 9/3247* (2013.01); *G06F 21/33* (2013.01); *H04L 2209/56* (2013.01)
  USPC ....................................................... 713/172

(56) References Cited

U.S. PATENT DOCUMENTS

| | | | |
|---|---|---|---|
| 2004/0133789 | A1 | 7/2004 | Gantman et al. |
| 2008/0284565 | A1* | 11/2008 | Duffy ........................... 340/5.86 |
| 2009/0235339 | A1 | 9/2009 | Mennes et al. |
| 2011/0140834 | A1* | 6/2011 | Kiliccote ...................... 340/5.2 |

FOREIGN PATENT DOCUMENTS

| | | |
|---|---|---|
| EP | 1 788 509 | 5/2007 |
| EP | 2 506 617 | 10/2012 |
| WO | WO 2009/056897 | 5/2009 |
| WO | WO 2010/066304 | 6/2010 |

OTHER PUBLICATIONS

International Search Report for PCT/US2012/071941 and Written Opinion of the International Searching Authority mailed Mar. 25, 2013.

Gao et al., "A 2D Barcode-Based Mobile Payment System," 2009 Third International Conf. on Multimedia and Ubiquitous Engineering, IEEE, USA, pp. 320-329, XP031561633.

International Preliminary Report on Patentability issued in PCT Application No. PCT/US2012/071941 mailed Jul. 10, 2014.

\* cited by examiner

STRONG AUTHENTICATION TOKEN WITH VISUAL OUTPUT OF PKI SIGNATURES

CROSS-REFERENCE TO RELATED APPLICATIONS

This application claims priority to U.S. Provisional application Ser. No. 61/581,897 entitled A STRONG AUTHENTICATION TOKEN WITH VISUAL OUTPUT OF PKI SIGNATURES, filed on Dec. 30, 2011, the contents of which are incorporated fully herein by reference.

FIELD OF THE INVENTION

The invention relates to strong authentication tokens for securing remote access to computers and applications and remote transactions over computer networks. More specifically, the invention relates to strong authentication tokens that visually display signatures that have been generated using asymmetric cryptography.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

In the past, application providers have relied on static passwords to provide the security for remote applications. In recent years it has become evident that static passwords are not sufficient and that more advanced security technology is required.

One way of solving the security problems associated with remote access to computer systems and applications over public networks consists of adding software applications offering security functions to general purpose devices such as a user's PC, or mobile device (e.g., mobile phone or Personal Digital Assistant (PDA)). The main problem associated with this approach is that general purpose devices have an inherently open architecture which makes them susceptible to all kinds of malicious software such as viruses and Trojans that could present fake messages to the user or capture whatever the user enters on the keypad or read in memory sensitive data associated with a security application or alter data before they are being signed. Therefore general purpose devices cannot be considered to have a trustworthy user interface and don't have secure means to store secrets such as PIN values and cryptographic keys. Furthermore, known solutions for mobile devices rely on wireless subscriber networks for the reception and/or transmission of transaction data. Such networks have inherent security and end point authentication mechanisms in place, which cannot be assumed to be present when the Internet is used for all transmissions.

An alternative solution, which solves the security issues of solutions based on general purpose devices, is offered by 'strong authentication token devices'. Typical examples of strong authentication tokens are the products of the DIGIPASS® line, commercialized by Vasco Data Security Inc. (see the website http://www.vasco.com). A hardware strong authentication token is an autonomous battery-powered device, dedicated to providing authentication and transaction signature functions, usually pocket-size, with its own display and keypad. In some cases the keypad is reduced to a single button or even completely omitted, in other cases the keypad can be a full keyboard. The display and keypad of a typical strong authentication token are non-removable and not user-serviceable, fully controlled by the token, and immune for interference by malicious software on a host computer. Therefore strong authentication tokens are considered to have a trustworthy user interface in contrast to e.g. Personal Computers (PCs) where there is always the possibility that malicious software such as a virus or a Trojan presents fake messages to the user, or captures whatever the user enters on the keypad, or reads in memory sensitive data associated with a security application or alters data before they are being signed. The main purpose of a strong authentication token is to generate dynamic security values which are usually referred to as 'One-Time Passwords' (OTPs) or dynamic passwords. Typically these OTPs are generated by combining a symmetric secret that is shared between the token and a verification server with a dynamic input value such as a time value, a counter value or a server challenge that is provided to the token, or a combination of these using a symmetric cryptographic algorithm. Some strong authentication tokens can also use data (such as transaction data) that have been provided to the token as dynamic input value or in combination with any of the dynamic input values mentioned above to generate a security value. In these cases the resulting security value is meant to indicate the user's approval of the data and the security value is usually referred to as an electronic signature or Message Authentication Code (MAC). Strong authentication tokens typically combine the dynamic value with a symmetric secret using a symmetric cryptographic algorithm resulting in a cryptogram. To be able to generate security values such as OTPs or MACs, strong authentication tokens are capable of doing cryptographic calculations based on symmetric cryptographic algorithms parameterized with a secret value or key. Typical examples of such symmetric cryptographic algorithms parameterized with a secret value or key are symmetric encryption/decryption algorithms (such as 3DES or AES) and/or keyed one-way hash functions (such as MD5 or SHA-1 in OATH compliant tokens). Strong authentication tokens are personalized with one or more symmetric secret keys that are supposed to be different for each individual token. To generate a one-time password or signature, the token typically performs the following steps. The token takes one or more dynamic input values (these could include a challenge generated by a server and typed-in on the keyboard by the user, and/or the value of the token's internal real-time clock, and/or the value of an internal counter managed by the token, and/or transaction data typed-in on the token's keyboard by the user). In some cases the dynamic input value may comprise a value that the token generated as part of the calculations of a previous security value such as the previously calculated security value itself or an intermediate value such as the previously calculated cryptogram from which the previous security value was derived. Such cases can be referred to as event-based tokens and they are essentially equivalent to counter-based tokens. The token puts the one or more dynamic input values into a specified format. The token then cryptographically combines the one or more input values with a personalized symmetric secret key stored securely in the token using a symmetric cryptographic algorithm. In a typical strong authentication token the token submits the one or more input values to a symmetric encryption/decryption algorithm and/or a keyed one-way hash function parameterized by a personalized symmetric secret key stored securely in the token. The result is a symmetric cryptogram or a hash value. The token transforms the symmetric cryptogram or hash value that is the outcome of this encryption/decryption or one-way hash into the actual OTP or MAC, i.e. some bits of the cryptogram or hash are selected (for example by truncating the cryptogram or hash) and the selected bits are converted in a human readable format (e.g. through decimalization). Sometimes the token adds extra information to the OTP or MAC such as synchronization information related to the time value or counter value that was used. Finally the generated OTP or MAC is presented to the user. The user may submit this value to the application server.

On the server side, the server (which is supposed to have a copy of the token's secret key or which is supposed to be able to regenerate the value of the token's secret key) for verifying the submitted OTP or signature essentially performs the same operations as the token, obtaining a reference or expected value for the OTP or signature. The server compares the submitted value with the reference value. The verification is deemed successful if there is a match between the submitted value and the reference value.

Some strong authentication tokens consist of a device with a display and a keypad that is capable of communicating with an inserted smart card whereby the generation of the OTPs or MACs is partly done by the device itself and partly by the inserted smart card.

A typical way to provide input data such as transaction data or a challenge to a strong authentication token is by letting the user enter the data manually on the token's keypad. When the amount of data that has to be entered in this way exceeds a few dozen characters, the process is often perceived by users as too cumbersome. To relieve the user, solutions have been devised whereby the input of data doesn't require the manual entry of said data by the user on the token's keypad. One example consists of tokens that allow for data input by means of a simple but cost effective optical interface (typically comprising a low number of cheap light sensitive components such as light sensitive diodes) with a low data rate, whereby the user holds the token close to a computer screen that displays a varying optical pattern having a limited number of varying regions (typically the optical pattern has only between 2 and 5 regions). Examples of such optical tokens are Digipass 700 and Digipass 300 offered by Vasco Data Security, and the tokens described in EP 1211841 5 Jun. 2002, EP 1788509 23 May 2007, U.S. Pat. No. 5,136,644 4 Aug. 1992. Due to the relative low refresh rate of the computers screens and the low number of regions in the varying optical pattern, the data rate is rather low and comparable to manual input of data.

The generated security values are typically displayed on the token's display as a string of digits or alphanumerical characters. Some strong authentication tokens also have means to generate synthetic speech and can present the generated security values to the user by means of synthesized speech consisting of a string of voiced numbers or alphanumerical characters.

After the token has presented the OTP or signature to user, the user manually transfers the OTP or signature to the application server, typically by typing it over. Because the user is relied upon to manually transfer the generated OTP or signature, for convenience reasons this OTP or signature cannot be long. In most cases the length of the OTP or signature is limited to something like 8 numerical digits. This explains why not all bits of the generated cryptogram are comprised in the OTP or signature, because of all bits of the cryptogram would be selected to be in the OTP, the OTP would become much too long to be conveniently copied by the user.

While strong authentication tokens have proven to be a very practical and secure solution, there are however also disadvantages. Most notably, since strong authentication tokens are based on symmetric cryptographic algorithms, any server that wishes to verify an OTP or signature generated by a specific strong authentication token must have access to the token's secret key. This limits the usability of the token to applications that have access to the token's secret key. Since the security of the token fully depends on the secrecy of its secret key, sharing the token's secret key with just any application server is not an option. Hence, in practice a specific token can usually be used with only a limited set of applications (usually the applications of one single application provider).

Also, the use of such tokens assumes that a plurality of token devices personalised with secret keys that are shared with an authentication server must be distributed among a plurality of users and that it must be tracked which user has which token device. This is a logistic process which represents a certain burden.

A different way of solving the security problems associated with remote access to computer systems and applications over public networks is provided by a Public Key Infrastructure (PKI) based on asymmetric cryptography. Using a Public Key Infrastructure one associates a public-private key pair with each user. The public key and the private key of the key pair are mathematically related. By means of asymmetric cryptography this public-private key pair can be used to authenticate the user, sign transactions, and set-up encrypted communications. The private key is used to generate signatures using an asymmetric cryptographic algorithm. That private key is kept strictly secret from any other party and is never shared with any verification server. To verify a signature generated with a specific private key, one has to perform the reverse operation on the signature using the corresponding public key that is mathematically associated with the private key. To allow verification of signatures, the public key associated with the private key is made available to any entity wishing to verify a signature generated with the private key. Since the public key cannot be used to generate signatures (only to verify them), there is no need to keep the public key secret. In a Public Key Infrastructure the key pair is associated with a certificate (issued by a trustworthy Certificate Authority) that binds that public-private key pair to a specific user. The certificate itself is a statement that binds the user's identity to the user's public key and that is signed by the certificate authority and that can be verified with the certificate authority's public key. This certificate authority's public key is widely distributed. Any entity trusting this certificate authority and its public key can now verify the signatures generated by a user whose public-private key pair has been certified by that certificate authority. There is no need for any application to have access to any secret information of a user to be able to authenticate that user or verify a signature of that user.

To guarantee an adequate level of security it is mandatory that each user's private key remains secret and can only be accessed to create a signature or to decrypt a message by the legitimate user associated with that key. It is common to rely on a smart card or a dedicated Universal Serial Bus (USB) device (sometimes referred to as a USB key or a USB token) to store the public-private key pair and the certificate and to carry out the cryptographic calculations involving the private key.

There are some disadvantages associated with PKI and the smart cards or USB tokens carrying the PKI keys and certificates:

1. Because PKI is based on asymmetric algorithms and because the private key that was used to generate the signature is not known to any verifying server, the server verifying a PKI signature cannot just perform the same steps as the client to obtain a reference signature that can be compared with the submitted signature. Instead the verifying server uses the public key with the received signature to reverse the client's calculations. This however assumes that the server has access to the full asymmetric cryptogram (i.e. not a truncated version) that the client calculated with the private key. This means that PKI based signatures comprise the full asymmetric cryptogram. Asymmetric cryptograms are quite lengthy (typically much longer than cryptograms generated by symmetric algorithms). This in combination with the fact that PKI signatures must comprise the full asymmetric cryptogram means that it is not feasible to present a PKI signature (e.g. in the form of a long string of alphanumeric characters or decimal or hexadecimal digits) to a user and expect that user to manually transfer that PKI signature to a verifying server. As a consequence PKI is inherently limited to environments and applications where there is a digital connection between clients and servers. In other words PKI is unsuitable for delivery channels where it is not possible to provide a digital connection between the container of the PKI certificate and private key on the one hand and an application server on the other hand.
2. PKI smart cards and USB tokens do not have a built-in power supply or a user interface. PKI smart cards and USB tokens therefore rely on the presence of an interfacing system that provides electrical power to the card, that is capable of digitally exchanging data with the card, and that is capable of interacting with the user (e.g. capturing the card's PIN and presenting the data that should be signed). USB tokens are usually plugged into a built-in USB port of a PC, where the USB port supplies power to the USB token and the human interface devices connected to the PC provide the user interaction capabilities (connected USB token model). PKI smart cards are usually operated by means of a PC equipped with a simple smart card reader, where the reader only supplies power to the smart card and enables communication between an application on the PC and the inserted smart card, and whereby the human interface devices connected to the PC provide the user interaction capabilities. Such a reader, which has no trustworthy user interface of its own, is often referred to as transparent card reader. These typical usage models reduce the mobility of the user, as most PCs are not pre-equipped with smart card readers, and ad-hoc installation of drivers for the readers of USB tokens often proves too cumbersome. It also presents a security problem: all user interaction (such as approving a signature or capturing the card's PIN) is done on the inherently insecure PC.

DISCLOSURE OF THE INVENTION

The following presents a simplified summary of the present invention in order to provide a basic understanding of some aspects described herein. This summary is not an extensive overview of the claimed subject matter. It is intended to neither identify key or critical elements of the claimed subject matter nor delineate the scope of the invention. Its sole purpose is to present some concepts of the claimed subject matter in a simplified form as a prelude to the more detailed description that is presented later.

What is needed is a solution that combines the security of strong authentication tokens with the application provider independence of PKI without the reliance on USB connections of the current PKI solutions.

Aspects of the present invention are based on the insight by the inventors that many applications that are secured by means of strong authentication tokens are accessed by the applications' users by means of an access device such as a PC (personal computer) or similar computing device (such as a smartphone, a notebook or a tablet PC) most of which have a camera and have the capability of capturing two dimensional pictures. The user's access device usually also has plenty of processing power to process the pictures it has captured.

Aspects of the invention are further based on the inventors' insight that even a single moderate resolution picture can convey a relative high amount of information. For example a single black-and-white 16*80 pixel image can convey 1280 bits. Cheap graphical 16*80 pixel Liquid Crystal Displays (LCD) are readily available.

According to one aspect of the invention a portable handheld authentication device is provided that comprises at least one data processing component and a display and that is adapted to: generate an input value; submit the input value to an asymmetric cryptographic operation, whereby the asymmetric cryptographic operation generates a result based on an asymmetric cryptographic algorithm parameterized by a first private key of a public-private key pair; obtain the result of said asymmetric cryptographic operation; generate an authentication message substantially comprising the result of the asymmetric cryptographic operation; encode the authentication message into one or more images; and display the one or more images on the display.

In some embodiments the authentication device further comprises a communication interface to communicate with a separate security device wherein: the separate security device stores said first private key of the public-private key pair; the separate security device is adapted to perform the asymmetric cryptographic operation; the authentication device obtains said result of said asymmetric cryptographic operation by requesting the separate security device to generate the result of the asymmetric cryptographic operation by performing the asymmetric cryptographic operation on the input value using the first private key stored in the separate security device and (thereafter) receiving from the separate security device the result of the asymmetric cryptographic operation generated by the separate security device. In some embodiments the separate security device comprises a removable smart card.

In some embodiments the authentication device further comprises a data input interface adapted to receive at least one variable data element that is external to the authentication device and the input value is generated using said at least one external variable data element.

In some embodiments the data input interface comprises a keyboard. In some embodiments the data input interface comprises an optical data input interface. In some embodiments the data input interface comprises an acoustical data input interface.

In some embodiments the at least one external variable data element comprises a challenge. In some embodiments the at least one external variable data element comprises transaction data.

In some embodiments the authentication device is further adapted to generate the input value using at least one variable data element that is internal to the authentication device. In some embodiments the authentication device comprises a real-time clock and the at least one internal variable data element comprises a time value provided by said real-time clock. In some embodiments the authentication device further comprises a counter and the at least one internal variable data element comprises a counter value provided by said counter.

In some embodiments the authentication device is further adapted to include in the authentication message data related to the input value. In some embodiments the data related to the input value comprises the input value.

In some embodiments the authentication device further comprises a first secure data storage component wherein the first secure data storage component stores said first private key and wherein the authentication device is further adapted to perform the asymmetric cryptographic operation and to generate the result of the asymmetric cryptographic operation by performing the asymmetric cryptographic operation on the input value using said first private key stored in said first secure data storage component.

In some embodiments the authentication device further comprises a second secure data storage component wherein said second secure data storage component stores a secret data element.

In some embodiments the authentication device is further adapted to generate data cryptographically related to the input value by cryptographically combining a first cryptographic key with data related to the input value and to include the generated data cryptographically related to the input value in the authentication message wherein said first cryptographic key is comprised in or derived from the secret data element.

In some embodiments said first cryptographic key comprises a symmetric cryptographic key that is shared with a verifying entity and the cryptographically combining is done using a symmetric cryptographic algorithm. In some embodiments said first cryptographic key comprises an asymmetric cryptographic key and the cryptographically combining is done using an asymmetric cryptographic algorithm. In some embodiments said first cryptographic key comprises an encryption key and the cryptographically combining comprises encrypting the data related to the input value using an encryption algorithm.

In some embodiments the authentication device is further adapted to generate data cryptographically related to the result of the asymmetric cryptographic operation by cryptographically combining a second cryptographic key with at least a part of the result of the asymmetric cryptographic operation and to include the generated data cryptographically related to the result of the asymmetric cryptographic operation in the authentication message and said second cryptographic key is comprised in or derived from the secret data element.

In some embodiments said second cryptographic key comprises a symmetric cryptographic key that is shared with a verifying entity and the cryptographically combining is done using a symmetric cryptographic algorithm. In some embodiments said second cryptographic key comprises an asymmetric cryptographic key and the cryptographically combining is done using an asymmetric cryptographic algorithm. In some embodiments said second cryptographic key comprises an encryption key and the cryptographically combining comprises encrypting the at least a part of the result of the asymmetric cryptographic operation using an encryption algorithm.

In some embodiments the authentication device is further adapted to include in the authentication message a reference to the public key corresponding to said first private key. In some embodiments the authentication device is further adapted to include in the authentication message a data element to identify the authentication device. In some embodiments the authentication device is further adapted to include in the authentication message a data element to identify the user. In some embodiments the authentication device is further adapted to include in the authentication message a data element to identify said separate security device.

According to another aspect of the invention a method for securing computer-based applications being remotely accessed by at least one user is provided that comprises the steps of: capturing one or more images displayed on the display of an authentication device of the at least one user whereby the one or more images have been encoded with an authentication message generated by the authentication device and whereby the authentication message comprises the result of an asymmetric cryptographic operation on an input value based on an asymmetric cryptographic algorithm parameterized by a first private key of a public-private key pair; decoding the one or more images to retrieve the authentication message; retrieving the result of the asymmetric cryptographic operation from the authentication message; verifying the authentication message; wherein verifying the authentication message comprises verifying the retrieved result of the asymmetric cryptographic operation using an asymmetric cryptographic algorithm parameterized with a public key corresponding to said first private key.

In some embodiments the result of the asymmetric cryptographic operation comprises a digital signature over the input value generated with a digital signature generation algorithm based on asymmetric cryptography and parameterized with said first private key and verifying the retrieved result of the asymmetric cryptographic operation comprises verifying the digital signature using a digital signature verification algorithm based on asymmetric cryptography and parameterized with the public key.

In some embodiments the method further comprises obtaining the value of the public key by using data comprised in the authentication message.

In some embodiments the authentication message further comprises a data element identifying the at least one user and the user identifying data element is used to obtain the value of the public key.

In some embodiments the authentication message further comprises a data element identifying the device (e.g. the authentication device itself or a separate security device) that performed the asymmetric cryptographic operation and the device identifying data element is used to obtain the value of the public key.

In some embodiments the authentication message further comprises data related to the input value and verifying the authentication message further comprises verifying the data related to the input value.

In some embodiments the authentication message further comprises data elements that are cryptographically related to the input value and verifying the authentication message comprises cryptographically verifying the data elements that are cryptographically related to the input value.

In some embodiments the authentication message further comprises a data element identifying the authentication device; the method further comprises the step of obtaining the value of a first cryptographic key using the authentication device identifying data element; and cryptographically verifying the data elements that are cryptographically related to the input value comprises using a cryptographic algorithm parameterized with said first cryptographic key.

In some embodiments the authentication message further comprises data elements that are cryptographically related to the result of the asymmetric cryptographic operation and verifying the authentication message comprises cryptographically verifying the data elements that are cryptographically related to the result of the asymmetric cryptographic operation.

In some embodiments the authentication message further comprises a data element identifying the authentication device; the method further comprises the step of obtaining the value of a second cryptographic key using the authentication device identifying data element; and cryptographically verifying the data elements that are cryptographically related to the result of the asymmetric cryptographic operation comprises using a cryptographic algorithm parameterized with said second cryptographic key.

In some embodiments the result of the asymmetric cryptographic operation comprised in the authentication message comprises at least one encrypted part (i.e. at least one part of the result of the asymmetric cryptographic operation has been encrypted) and retrieving the result of the asymmetric cryptographic operation from the authentication message comprises decrypting the at least one encrypted part.

In some embodiments the authentication message further comprises a data element identifying the authentication device; the method further comprises the step of obtaining the value of a third cryptographic key using the authentication device identifying data element; and the decrypting of the at least one encrypted part comprises using a decryption algorithm parameterized with said third cryptographic key.

An embodiment according to an aspect of the invention comprises an authentication device adapted to obtain the result of an asymmetric cryptographic operation (e.g. by performing itself the asymmetric cryptographic operation, or by requesting a separate security device to perform the asymmetric cryptographic operation and subsequently receiving from the separate security device the result of the asymmetric cryptographic operation performed by the separate security device), to generate one or more images that encode (substantially) all the bits of a representation of the result of the asymmetric cryptographic operation and to display these images on its display.

One embodiment of the invention comprises an authentication device adapted to generate an asymmetric signature (i.e. a digital signature based on asymmetric cryptography), to generate one or more images that encode (substantially) all the bits of the generated signature and to display these images on its display.

In some embodiments the authentication device comprises a data processing component adapted to generate a digital representation of the result of an asymmetric cryptographic operation. In some embodiments the data processing component is adapted to encode a digital representation of the result of an asymmetric cryptographic operation into one or more images, which are not alpha-numeric characters. In some embodiments these images may comprise bitmaps. In some embodiments the pixels of these images can take only one of two values (e.g. black or white). In general the representation of the result of an asymmetric cryptographic operation in the one or more images is not in a human interpretable form.

In some embodiments the authentication device comprises a data processing component adapted to perform asymmetric cryptographic operations. In some embodiments the data processing component is adapted to perform an encryption of an input value according to an asymmetric cryptographic algorithm and using the private key of a public-private key pair to parameterize the asymmetric cryptographic algorithm. In some embodiments the asymmetric cryptographic algorithm may for example comprise the RSA (Rivest-Shamir-Adleman) algorithm or may for example be based on elliptic curve cryptography (ECC).

In some embodiments the authentication device comprises a memory component to store secret data such as a PIN value and/or one or more cryptographic keys such as a private key of a public-private key pair or a symmetric cryptographic key, and/or a secret data element that may be shared with another entity such as for example an authentication server and from which for example cryptographic keys may be derived. In some embodiments the authentication device is also adapted to store one or more certificates or certificate chains related to one or more private keys stored and/or used by the authentication device.

In some embodiments the authentication device comprises a digital communication interface to communicate with a second device e.g. a separate security device. In some embodiments this second device is adapted to perform asymmetric cryptographic operations. In some embodiments the second device is adapted to store at least one private key of a public-private key pair. In some embodiments the second device is also adapted to store one or more certificates or certificate chains related to one or more private keys stored and/or used by the second device. In some embodiments the second device is also adapted to store data identifying the second device (e.g. a serial number). In some embodiments the second device is also adapted to store data identifying the user (e.g. the user's name, or the user's social security number, or the user's national id number). In some embodiments the second device may comprise a smart card. In some embodiments the smart card may support ISO/EIC 7816-4 compatible communication protocols. In some embodiments the authentication device may comprise a smart card interface to communicate with the smart card. In some embodiments the authentication device may exchange smart card commands with the smart card using ISO/EIC 7816-4 compatible communication protocols. In some embodiments the second device may comprise a so-called USB key or USB token.

In some embodiments the authentication device comprises a display to display the generated images encoding the representation of the generated signature or result of the asymmetric cryptographic operation. In some embodiments the display comprises an LCD (Liquid Crystal Display). In some embodiments other display technology is used. In some embodiments the display comprises a graphical display. In some embodiments the display has a resolution of at least 1000 pixels. In some embodiments the display has a column resolution of at least 80 columns. In some embodiments the display has a line resolution of at least 16 lines. In some embodiments the display has a resolution of 16*80 pixels. In some embodiments the display may comprise a touch screen.

In some embodiments the authentication device comprises an input interface for the user to provide data to the authentication device. In some embodiments the input interface is adapted to allow the user to enter a challenge value. In some embodiments the input interface is adapted to allow the user to enter transaction data values. In some embodiments the input interface is adapted to allow the user to enter a PIN value. In some embodiments the input interface comprises an optical interface to read in data, for example by scanning an optical pattern on the display of the user's access device or by capturing and decoding images. In some embodiments the input interface comprises an acoustic interface to read in data by capturing and decoding sounds emitted by the user's access device. In some embodiments the input interface comprises a user input interface adapted to allow the user to manually enter information into the authentication device. In some embodiments the user input interface comprises one or more buttons. In some embodiments the user input interface comprises a keyboard. In some embodiments the user input interface comprises one or more thumbwheels. In some embodiments the user input interface may comprise a touch screen.

In some embodiments the authentication device may comprise a secure storage component adapted to store secrets which may comprise cryptographic keys. In some embodiments the authentication device may be adapted to perform cryptographic algorithms which may comprise hashing algorithms and/or symmetric or asymmetric encryption/decryption algorithms and/or symmetric or asymmetric electronic signature algorithms.

Another embodiment according to an aspect of the invention comprises a method for securing computer-based applications being remotely accessed by users. The method comprises the following steps. A plurality of users is provided with authentication devices as described above. Users access an application remotely using an access device equipped with a camera (or an equivalent optical device to electronically capture images).

Users may be asked to provide a security value e.g. to authenticate themselves or to sign a transaction. This security value may comprise an authentication message that may be generated by an authentication device according to the invention and communicated to a verifying entity according to the invention as described below in more detail.

The verifying entity (which may for example comprise an application and/or an authentication server) verifies the authentication message and may use the result of this verification to decide upon further actions, in particular to decide whether to accept or not the user and/or user interaction such as a transaction submitted to the user. For example the application may accept a log in of a user if verification of the authentication message is successful.

Providing External Data to the Authentication Device.

The users may be given a challenge value. This challenge may e.g. comprise a random value generated by an application or authentication server. This challenge may also be derived from e.g. a hash on transaction data. Users may be requested to provide the challenge to their authentication device. Users may provide this challenge to the authentication device. Users may also be requested to provide certain transaction related data to the authentication device. Users may provide these transaction related data to the authentication device. Users may provide data such as a challenge or transaction data to their authentication device e.g. by presenting these data to an input interface of the authentication device for example by typing in the data on the authentication device's keyboard. These data may be provided to the user e.g. by displaying these data in a human interpretable form (such as a string of characters) on the display of the user's access device.

Generating an Input Value.

The authentication device constructs an input value. Constructing the input value may comprise deriving a value from a data element provided by the user such as a challenge value or transaction related data. Constructing the input value may also (i.e. additionally or alternatively) comprise deriving a value from one or more internal data elements stored, managed or generated by the authentication device. In some embodiments the one or more internal data elements may comprise a data element derived from the value of a real-time clock. In some embodiments the one or more internal data elements may comprise a data element derived from the value of one or more counters. In some embodiments these one or more counters are stored by the authentication device. In some embodiments these one or more counters are automatically incremented by the authentication device.

In some embodiments some of the internal data elements may be provided by a second device (e.g. a separate security device). In some embodiments constructing the input value may be entirely or partly done by a second device (e.g. a separate security device). For example in some embodiments the input value may comprise or be based on the value of a counter or real-time clock comprised in the separate security device. In some embodiments the input value may be constructed by the separate security device using data elements that are fully provided by the separate security device itself. For example in some embodiments the input value may be constructed by the separate security device from the value(s) of a counter and/or real-time clock comprised in the separate security device. In some embodiments the input value may be constructed by the separate security device by combining data elements that are external to the separate security device and that the separate security device obtains from the authentication device (for example a challenge value, transaction related data, and/or the value of a real-time clock in the authentication device) with data elements that are internal to the separate security device (such as for example the value(s) of a counter and/or a real-time clock comprised in the separate security device). In some embodiments the input value may be constructed by the separate security device by using a precursor value that the separate security device obtains from the authentication device and that has been generated by the authentication device (e.g. using data elements such as for example a challenge value, transaction related data, and/or the value of a real-time clock in the authentication device). In some embodiments the separate security device generates the input value by combining the precursor value with data elements that are internal to the separate security device (such as for example the value(s) of a counter and/or a real-time clock comprised in the separate security device). In some embodiments the separate security device generates the input value by transforming the precursor value using a mathematical function such as for example a hashing function such as SHA-1.

In some embodiments constructing the input value may comprise the authentication device cryptographically combining data with a secret data element such as secret cryptographic key. For example, in some embodiments the authentication device may cryptographically hash (e.g. with the SHA-1 hashing algorithm) a combination (e.g. a concatenation) of one or more of the above data elements and a secret data element and the authentication device may derive the input value from the resulting hash. In some embodiments the authentication device may electronically sign a combination (e.g. a concatenation) of one or more of the above mentioned data elements and derive the input value from the electronic signature. In some embodiments the authentication device may encrypt a combination (e.g. a concatenation) of one or more of the above data elements using an encryption algorithm parameterised with a secret cryptographic key and the authentication device may derive the input value from the resulting encrypted data. In some embodiments the encryption algorithm may comprise a symmetric encryption algorithm such as for example the DES (Data Encryption Standard) or AES (Advanced Encryption Standard) algorithm. In some embodiments the encryption algorithm may comprise an asymmetric encryption algorithm such as for example the RSA algorithm and the cryptographic key may comprise a private key of a public-private key pair. In some embodiments the authentication device may calculate a cryptographic MAC (Message Authentication Code) over a combination (e.g. a concatenation) of one or more of the above mentioned data elements and derive the input value from the MAC (e.g.

by including the MAC in the input value). In some embodiments the MAC may be calculated by applying a symmetric block cipher in CBC (Cipher-Block Chaining) mode to the combination of one or more of the above mentioned data elements and retaining (a part of) the cryptogram of the last block.

In some embodiments the authentication device is adapted to store the secret data element. For example the authentication device may comprise a secure memory component for storing the secret data element. In some embodiments each individual authentication device may have its own individual value for the secret data element. In other embodiments the value of the secret data element is shared by a plurality of authentication devices. In some embodiments (in particular in embodiments where the secret data element is used by the authentication device with a symmetric cryptographic algorithm) the value of the secret data element is shared with e.g. an authentication server or application server which may for example store in a database the values of the secret data elements along with the identification data of the associated authentication devices. In some embodiments the authentication server may be adapted to reconstruct the value of the secret data element associated with a particular authentication device, for example by deriving the secret data element from a master key and identification data of the particular authentication device.

The Authentication Device Submitting the Generated Input Value to an Asymmetric Cryptographic Operation.

The authentication device submits the input value to an asymmetric cryptographic operation according to an asymmetric cryptographic algorithm. The asymmetric cryptographic algorithm may be parameterized by the private key of a public-private key pair. In some embodiments the asymmetric cryptographic operation comprises encrypting the input value using a private key of a public-private key pair and an asymmetric cryptographic algorithm parameterized by that private key. In some embodiments the asymmetric cryptographic operation may comprise encrypting a value derived from the input value (such as a digital digest generated using a digital digest algorithm such as a hashing algorithm such as for example SHA-1) using a private key of a public-private key pair and an asymmetric cryptographic algorithm parameterized by that private key. In some embodiments the asymmetric cryptographic algorithm may for example comprise the RSA algorithm or an algorithm based on elliptic curve cryptography. In some embodiments the asymmetric cryptographic algorithm may comprise an electronic signature algorithm based on asymmetric cryptography.

In some embodiments the asymmetric cryptographic operation may be performed by a separate security device. In some embodiments the separate security device may be a removable security device and the authentication device may comprise a communication interface to communicate with the separate security device. In some embodiments the separate security device may comprise e.g. a PKI smart card.

In some embodiments a digest of the input value is generated (e.g. by hashing the input value for example by using a cryptographic hashing algorithm such as SHA-1) and the digest of the input value is submitted to the asymmetric cryptographic operation. In some embodiments the authentication device generates the digest of the input value. In some embodiments the digest of the input value is generated by the separate security device.

The authentication device obtaining the result of the asymmetric cryptographic operation.

The authentication device obtains the result of the asymmetric cryptographic operation. In some embodiments this result comprises an asymmetric cryptogram. In some embodiments this result comprises a digital or electronic signature generated using a digital or electronic signature algorithm based on asymmetric cryptography. In some embodiments the authentication device obtains the result of the asymmetric cryptographic operation by means of one or more responses that the authentication device receives from the separate security device to commands that the authentication device has sent to the separate security device. In some embodiments the authentication device obtains the result of the asymmetric cryptographic operation in the form of the output of a hardware or software component that is embedded in the authentication device and to which the input value was submitted to perform the asymmetric cryptographic operation on.

The Authentication Device Generating an Authentication Message.

The authentication device generates an authentication message that comprises the result of the asymmetric cryptographic operation. The authentication message may comprise substantially the entire result of the asymmetric cryptographic operation. In some embodiments the authentication message comprises the entire result of the asymmetric cryptographic operation (e.g. the entire asymmetric cryptogram or the entire digital signature). In some embodiments the authentication message may comprise the entire result of the asymmetric cryptographic operation except for a small number of bits. This may be the case for example to fit the result of the asymmetric cryptographic operation into the maximum size of an authentication message that can be encoded into a single image that can be displayed by the authentication device. An entity that validates the authentication message may still validate the result of the asymmetric cryptographic operation in spite of the missing bits by a trial and error method whereby all possible values for the missing bits are tried until either a value for the result of the asymmetric cryptographic operation is found that validates successfully or until all possible values for the missing bits have been tried without any value yielding a result of the asymmetric cryptographic operation that validates successfully. The number of bits that may be left out of the result of the asymmetric cryptographic operation comprised in the authentication message may be determined or chosen as a function of a trade-off between the disadvantages (e.g. lower security and/or higher computational efforts for validation) and the advantages (shorter authentication messages) of leaving out bits of the result of the asymmetric cryptographic operation. In one embodiment no more than 8 bits of the asymmetric cryptogram are left out of the authentication message. The authentication message can be said to substantially comprise the entire result of the asymmetric cryptographic operation if at least 95% of the bits of the entire result of the asymmetric cryptographic operation that are relevant for the cryptographic verification of the result of the asymmetric cryptographic operation are represented in the authentication message.

The authentication device cryptographically combines the result of the asymmetric cryptographic operation with a secret data element.

In some embodiments generating the authentication message comprises the authentication device combining the result of the asymmetric cryptographic operation with a secret data element which may be stored in the authentication device or which may be derived from another (secret) data element that is stored in the authentication device. In some embodiments the secret data element or a data element from which the secret data element is derived may be shared with another entity such as for example an authentication server. In some embodiments this combining may comprise applying a cryptographic algorithm parameterized with the secret data element to the result of the asymmetric cryptographic operation. For example in some embodiments the authentication device generates an electronic signature over data that comprise at least a part of the result of the asymmetric cryptographic operation using the secret data element as an electronic signature key. In some embodiments the electronic signature algorithm may be based on symmetric cryptography. In some embodiments the electronic signature algorithm may be based on asymmetric cryptography. In some embodiments the authentication message comprises also this electronic signature. In some embodiments the authentication device encrypts the result of the asymmetric cryptographic operation using the secret data element as an encryption key. In some embodiments the authentication device encrypts the entire result of the asymmetric cryptographic operation. In other embodiments the authentication device encrypts only a part of the result of the asymmetric cryptographic operation. In some embodiments the authentication device applies a symmetric encryption algorithm for this encryption. In some embodiments the authentication device applies an asymmetric encryption algorithm for this encryption. In some embodiments the authentication message comprises at least a part of the (entirely or partly) encrypted result of the asymmetric cryptographic operation. In some embodiments the authentication device calculates a MAC (Message Authentication Code) over data that comprise at least a part of the result of the asymmetric cryptographic operation using a cryptographic algorithm (e.g. a symmetric encryption algorithm in CBC-mode) that is parameterized by the secret data element. In some embodiments the authentication message comprises this MAC. In some embodiments the authentication device may cryptographically combine parts of the result of the asymmetric cryptographic operation or data derived from this result (such as e.g. a hash) with values of one or more dynamic variables (such as a time value of a real-time clock, and/or a counter value, and/or a challenge value) and a secret data element. In some embodiments the authentication device may share this secret data element with a verifying entity such as for example an authentication server.

One advantage of thus involving a secret data element in the generation of the input value or in the generation of the authentication message from the asymmetric cryptogram (e.g. by cryptographically combining a secret data element with the result of the asymmetric cryptographic operation or data related with the input value), is that this can be used to prove the involvement of the authentication device in the calculation of the input value and/or the authentication message. This may be particularly useful in embodiments wherein the asymmetric cryptographic operation is performed not by the actual authentication device but by a separate security device (that may be removable) adapted to perform asymmetric cryptographic (such as for example a PKI smart card). In this way certain types of attacks may be foiled whereby an attacker gets access to the separate security device (for example if the security device is a PKI smart card and the user inserts the smart card into a smart card reader connected to a PC infected with malware under the control of the attacker) and tries to emulate the authentication device to obtain valid authentication messages. Such attacks are much harder if the authentication device involves in the generation of the input value and/or authentication message a secret data element that is securely stored in the authentication device and that may be assumed to be unknown to the attacker. In that case the attacker is unlikely to be able to generate a correct value for the input value and/or the authentication message. By (cryptographically) validating the correctness of the input value and/or the authentication message, a validation entity (such as an authentication server) may detect such attempts by an attacker to emulate the authentication device.

The Authentication Device Includes Extra Data in the Authentication Message.

In some embodiments the authentication message may also comprise extra information (i.e. other data than only the result of the asymmetric cryptographic operation).

In some embodiments this extra information may for example comprise an identifier related to the authentication device (e.g. a serial number). In some embodiments the device identifier may be used e.g. by a verifying entity such as an authentication server to retrieve or obtain the value of a secret data element that the authentication device may have used (for example as explained in some of the paragraphs above). In some embodiments the device identifier may be used to look-up a cryptographic key in a database. This cryptographic key may comprise a symmetric secret cryptographic key shared with the authentication device. This cryptographic key may also comprise a public key corresponding to a private key stored in and/or used by the authentication device.

In some embodiments this extra information may for example comprise an identifier of the user (e.g. the user's name as read from the smart card that performed the asymmetric cryptographic operation). In some embodiments such a user identifier comprised in the authentication message may be used e.g. by the application to determine a user id e.g. during a log-in attempt. This may increase the user convenience since in such a case it may not be necessary for the user to provide a login ID or a user ID when the user wants to access an application.

In some embodiments this extra information may for example comprise an identifier of a separate security device that performed the asymmetric cryptographic operation such as for example a serial number of a PKI smart card.

In some embodiments this extra information may for example comprise a data element that may allow an application or verification server to identify, obtain or retrieve the public key that corresponds to the private key that was used to perform the asymmetric cryptographic operation. For example the extra information may comprise the public key itself, or it may comprise a certificate comprising the public key or containing a reference to the public key, or it may comprise a serial number of such a certificate that may be used to obtain the actual certificate, or it may comprise a URL (Uniform Resource Locator) allowing to retrieve the public key and/or the certificate. In some embodiments an identifier of the user may be used to obtain the public key and/or certificate e.g. by using the user identifier as a search key in a database containing the public key and/or certificate. In some embodiments a device identifier may be used in a similar way to retrieve the public key and/or the certificate. This device identifier may comprise a data element identifying the device that performed the asymmetric cryptographic operation and/or that stored the private key used in generating the result of the asymmetric cryptographic operation such as for example in some embodiments the authentication device itself or in other embodiments a separate security device.

In some embodiments this extra information may comprise the input value or data related to the input value such as data related to a counter value or to a time value which may have been generated by the authentication device or a separate security device and that may have been used to generate the input value. In some embodiments these data related to the input value may be cryptographically derived by the authentication device from the input value or from data that the authentication device used to obtain the value of the input value. For example the input value may comprise a set of transaction data and the data related to the input value that are comprised in the authentication message may comprise a MAC over these transaction data calculated by the authentication device using a secret key stored in the authentication device. For example in some embodiments the authentication device may generate the input value using the value(s) of one or more dynamic variables (such as the time value of a real-time clock and/or a counter value and/or a challenge and/or transaction data) and the authentication device may comprise one or more of these values in the authentication message. In particular if one or more internal dynamic variables (such as a real-time clock and/or a counter) are used to generate the input value, the authentication device may include in the authentication message data indicating the values of these internal dynamic variables. In some embodiments the authentication device may include in the authentication message a one-time password that the authentication device has generated by cryptographically combining a secret data element (that may be shared with e.g. a verifying entity such as an application or authentication server) with one or more values of one or more dynamic variables (such as a real-time clock and/or a counter and/or a challenge and/or transaction data) that the authentication device may have used to generate the input value. In some embodiments the input value may also comprise this one-time password. In some embodiments the input value itself is included in the authentication message. In some embodiments the authentication device encrypts the input value with a secret data element and includes the encrypted input value in the authentication message. In some embodiments the authentication device encrypts data that are indicative of values of data elements that the authentication device has used to generate the input value and the authentication device includes these encrypted data elements in the authentication message.

In some embodiments the authentication message may be encoded in a particular format. In some embodiments the authentication message is encoded in a format that enables determining the presence, position and/or length of the various data elements that make up the authentication message. In some embodiments the various data elements making up the authentication message may be combined in an authentication message using a TLV (Tag-Length-Value) structure.

The Authentication Device Encodes the Authentication Message in One or More Images.

The authentication device generates one or more images encoding the authentication message. In general these images don't represent the authentication message in a human interpretable form. In some embodiments data represented in human interpretable form may be presented along with the images. In general the data represented in human interpretable form does not comprise the result of the asymmetric cryptographic operation. In a particular embodiment data in a human interpretable form may comprise for example a one-time password (for example represented as a string of characters) that may have been generated by the authentication device (e.g. by cryptographically combining the value(s) of one or more dynamic variables such as a real-time clock value, a counter value, a challenge value or transaction data values with a secret data element that is shared between the authentication device and a verifying entity such as an application or authentication server). In some embodiments some of the images comprise a bitmap. In some embodiments the authentication device encodes some of the images using a two-dimensional barcode or matrix barcode format. In some embodiments the authentication device encodes some of the images using the QR code (Quick Response) format. In some embodiments some images are black-and-white coded. In some embodiments some images may be coded using a plurality of grey-scale levels. In some embodiments some images may be coded using a colour coding scheme. In some embodiments some images may use a coding scheme comprising a data redundancy mechanism that may provide the possibility of error detection and/or error correction. In some embodiments the data redundancy rate may be variable. In some embodiments a coding scheme may be used whereby the images comprise an indication of the redundancy rate that has been used. In some embodiments a coding scheme may be used with a fixed resolution. In some embodiments a coding scheme may be used with a variable resolution. In some embodiments a coding scheme may be used whereby the image comprises an indication of the resolution. In some embodiments a coding scheme may be used whereby the images comprise certain elements that allow a decoder to detect the orientation, scaling and/or possible deformation of the images. In some embodiments the authentication message may be encoded over more than one image and the authentication device may add sequence information to enable an entity that captures and decodes the images to correctly assemble the contents of multiple images to obtain the full authentication message.

The Authentication Device Displays the One or More Images.

The authentication device displays the one or more images on its display. In some embodiments the authentication displays more than one image and cycles through a plurality of images displaying each of these images for a certain amount of time. This has the advantage that, for a given display resolution, more data can be transferred than in a single image (this may be in particular advantageous in case also a certificate needs to be transferred) or that, for a given data size, a cheaper display with a lower resolution may be used for the authentication device.

The Access Device Captures the One or More Images.

The user holds the authentication device in front of the camera of the access device. In some embodiments the one or more images consist of only a single image. This has the advantage that the user must hold the authentication device in front of the camera for a shorter time.

The access device takes one or more pictures or a movie of the authentication device that is displaying the one or more images encoding the digital representation of the obtained result of the asymmetric cryptographic operation.

In some embodiments the access device may provide guidance on how to hold the authentication device in front of the access device and/or may provide feedback to the user with respect to the success of capturing the images displayed by the authentication device. For example in some embodiments the access device may display the images that it captures so that the user may see how the authentication device and the images that it displays is being seen by the access device. In some embodiments, in case the access device experiences problems to capture the images displayed by the authentication device, for example in case the user is holding the authentication device too tilted or too close or too far or too offset with respect to the ideal position in front of the access device's camera, the access device may attempt to diagnose the reason of the capturing problems and may suggest the user on how to remedy the problem. For example the access device may detect that the image is very distorted because the user is holding the authentication device not sufficiently parallel to the camera's image plane and may suggest the user to tilt the authentication device to be more parallel to the camera's image plane, or the access device may detect that the user is holding the authentication device to far and may suggest the user to hold it closer to the camera, or the access device may detect that a part of the image displayed by the authentication device is out of view of the access device's camera and may suggest to move the authentication device more towards the centre of the camera's view angle. In some embodiments the access device may notify the user that the image(s) displayed by the authentication device have been successfully captured and decoded, so that the user knows when it is no longer necessary to hold the authentication device in front of the camera.

Test Mode.

In some embodiments the authentication device may be capable of generating one or more test images that may be of a particular format and that may be used for example in a test mode for example to help the access device or application in diagnosing problems in capturing images displayed by the authentication device.

Retrieving the Authentication Message.

From the captured pictures or movie, the one or more images encoding the authentication message are reconstructed. The reconstructed images are decoded to retrieve the authentication message.

Verifying the Authentication Message.

Then the retrieved authentication message may be verified. Verifying the retrieved authentication message may comprise several steps: retrieving a number of data elements comprised in the retrieved authentication message and verifying these data elements. Data elements comprised in the retrieved authentication message to be retrieved and verified include the result of the asymmetric cryptographic operation and may also include data related to the input value and/or data elements that are cryptographically related to the result of the asymmetric cryptographic operation.

Retrieving and Verifying the Result of the Asymmetric Cryptographic Operation.

Verifying the authentication message comprises retrieving from the authentication message the obtained result of the asymmetric cryptographic operation and verifying this result of the asymmetric cryptographic operation.

Retrieving the Result of the Asymmetric Cryptographic Operation.

In some embodiments the result of the asymmetric cryptographic operation that is comprised in the authentication message is partly or entirely encrypted. Retrieving the result of the asymmetric cryptographic operation from the authentication message may comprise decrypting the parts of the result of the asymmetric cryptographic operation in the authentication message that are encrypted. In some embodiments some of these encrypted parts may have been encrypted by the authentication device using a symmetric encryption algorithm (such as e.g. AES) and decrypting these encrypted parts may involve the use of the corresponding symmetric decryption algorithm. In some embodiments the encryption key that the authentication device has used to encrypt parts of the result of the asymmetric cryptographic operation may comprise or may be derived from a secret data element that may be stored in the authentication device and that is shared with another entity such as for example an authentication server. In some embodiments some of these encrypted parts may have been encrypted by the authentication device using an asymmetric encryption algorithm parameterised with a private key and decrypting these encrypted parts may involve the use of the corresponding asymmetric decryption algorithm parameterised with a public key corresponding to this private key. In some embodiments this public key may be retrieved using a data element comprised in the authentication message.

Verifying the Result of the Asymmetric Cryptographic Operation.

In some embodiments the verification of the result of the asymmetric cryptographic operation is performed using standard methods for verifying the result of an asymmetric cryptographic operation. In some embodiments the result comprises an electronic or digital signature generated using a private key and an asymmetric cryptographic algorithm and the verification of the result may comprise verifying the signature using an asymmetric cryptographic algorithm and a public key corresponding to the private key that was used to generate the signature. In some embodiments the verifying comprises using a public key associated with the private key that is assumed to have been used to generate the asymmetric cryptogram. In some embodiments the verifying comprises decrypting an asymmetric cryptogram using an asymmetric cryptographic algorithm and the public key associated with the private key that is assumed to have been used to generate the asymmetric cryptogram. In some embodiments verifying the result of the asymmetric cryptographic operation may comprise verifying a certificate or a certificate chain related to the public key associated with the private key that is assumed to have been used to generate the asymmetric cryptogram. This verification of the certificate or certificate chain may be done using certificate verification methods known in the art.

Obtaining the Public Key.

In some embodiments the public key and/or a certificate corresponding to the public key are determined using a data element that is retrieved from the authentication message. For example, in some embodiments the public key and/or the certificate may be comprised in the authentication message and may be retrieved therefrom. In other embodiments that data element may comprise a reference value that refers to the public key or certificate. For example the reference value may comprise a URL that allows retrieving of the public key and/or certificate from a server, or the reference value may comprise an index that may be used to retrieve the public key and/or certificate from a database. The reference value may for example comprise a certificate serial number or a serial number of the separate security device or the authentication device that performed the asymmetric cryptographic operation. In some embodiments the authentication message may comprise a data element related to the user (such as for example the user's name or national id number) and that user related data element may be used to retrieve the public key and/or certificate e.g. from a database.

Handling Missing Bits of the Result of the Asymmetric Cryptographic Operation.

In some embodiments the authentication message may comprise substantially the full result of the asymmetric cryptographic operation. In some embodiments each and every bit of the result of the asymmetric cryptographic operation is included in the authentication message. In some embodiments a small number of bits (for example 4 bits) of the result of the asymmetric cryptographic operation are not comprised in the authentication message. In some embodiments the authentication message comprises all bits of an asymmetric cryptogram except for a small number of bits of the cryptogram. Verifying the result of the asymmetric cryptographic operation in spite of the missing bits may comprise assigning one by one all possible values to the missing bits and verifying one by one the combinations of the part of the result of the asymmetric cryptographic operation comprised in the authentication message with each of these possible values until one of the combinations has been validated successfully (and validation of the result of the asymmetric cryptographic operation may be deemed successful) or until all combinations have been tried unsuccessfully.

Reconstructing the Input Value.

In some embodiments a reference value for the input value that has been submitted by the authentication device to the asymmetric cryptographic operation is determined and used in the verification of the result of the asymmetric cryptographic operation. In some embodiments the input value is comprised in the authentication message and the reference value is set to this input value comprised in the authentication message. In some embodiments the input value is comprised in the authentication message and this encrypted input value may be decrypted to obtain the reference value for the reference value of the input value. In some embodiments the reference value is derived from one or more data elements similarly to the way the authentication device has derived the input value and determining the reference value may comprise determining the value(s) of the one or more data elements that the authentication device has used to generate the input value. In some embodiments the value(s) of some of these data elements may be determined by retrieving from the authentication message data elements that are indicative of these values. In some embodiments these data elements that are indicative of the values of data elements that the authentication device used to generate the input value may have been encrypted by the authentication device and the encrypted values may have been included in the authentication message. Determining a reference value of the input value may then comprise retrieving these encrypted values from the authentication message and decrypting them prior to using them to generate the reference value.

Using the Reference Value of the Input Value in Verifying the Result of the Asymmetric Cryptographic Operation.

In some embodiments the reference value may be used in verifying the result of the asymmetric cryptographic operation comprised in the authentication message. For example in some embodiments a verifying entity may use a public key associated with the authentication device's private key (i.e. the private key used by the authentication device to generate the result of the asymmetric cryptographic operation) to perform an asymmetric cryptographic algorithm on the result of the asymmetric operation comprised in the authentication message. The resulting value may then be compared with the reference value for the input value. For example in some embodiments the result of the asymmetric cryptographic operation comprised in the authentication message may have been obtained by the authentication device encrypting the input value with a private key and an asymmetric cryptographic algorithm and a verifying entity may verify the result of this asymmetric cryptographic operation by decrypting this result with the public key corresponding to the authentication device's private key and comparing the decrypted value with the reference value for the input value. In some embodiments the result of the asymmetric cryptographic operation comprised in the authentication message may have been obtained by the authentication device first generating a digest message using the input value (which may for example comprise hashing the input value using a hashing algorithm such as SHA-1) and then encrypting the digest value with a private key and an asymmetric cryptographic algorithm and a verifying entity may verify the result of this asymmetric cryptographic operation by decrypting this result with the public key corresponding to the authentication device's private key and comparing the decrypted value with the reference value for the input value or with a value derived from the reference value such as for example a reference hash or reference digest value generated using the reference value for the input value.

Verifying Data Related to the Input Value.

In some embodiments the authentication message may also comprise data related to the input value that was submitted to the asymmetric cryptographic operation to generate the result of the asymmetric cryptographic operation and verifying the authentication message may also comprise verifying these data related to the input value. In some embodiments verifying these data related to the input value may comprise verifying whether one or more of these data elements have an acceptable value. For example in some embodiments the authentication device may construct the input value using the value of a real-time clock and/or a counter and may include data related to these values in the authentication message and verifying these data may comprise verifying whether these values fall within acceptable margins of an expected value.

In one example the authentication device may use a value of its real time clock to determine the input value and may include in the authentication message a data element that gives an indication of this value (e.g. in one embodiment the year, month, day, hour, minute, second, or in another embodiment only the hour, minute and second of the moment of determining the input value). A verifying entity may verify whether that data element present in the authentication message refers to a time value that deviates by no more than for example one minute from the actual real time as known to the verifying entity of the moment that the authentication message was supposed to have been generated.

In another example the authentication device may use a value of a counter that monotonically increases (respectively decreases) its value upon each usage to determine the input value and may include in the authentication message a data element that gives an indication of this counter value (e.g. in one embodiment the full value of the counter, or in another embodiment only a certain number of the least significant bits or digits of that counter such as for example the least significant 4 bits or the list significant 2 digits). A verifying entity may verify whether that data element present in the authentication message refers to a counter value that is indeed higher (respectively lower) then the last known value of that counter.

In some embodiments the authentication device may generate a one-time password, for example using a known algorithm (such as may be used by known strong authentication tokens) for generating one-time passwords with a secret data element in the authentication device and a dynamic variable which may comprise or may be derived from e.g. a challenge and/or a time value and/or a counter value and/or transaction data, and the input value may comprise this one-time password. In such embodiments verifying the input value may comprise verifying this one-time password using e.g. known verification methods for verifying one-time passwords. In some embodiments this may prove to the verifying entity that a valid authentication device has been used to generate the input value. In some embodiments this may prove to the verifying entity that a particular authentication device has been used to generate the input value.

Verifying Data Elements that are Cryptographically Related to the Input Value.

In some embodiments the authentication message may also comprise data elements that are cryptographically related to the input value (i.e. that have been generated by the authentication device by cryptographically combining the data related to the input value with a secret data element), and verifying the authentication message may also comprise verifying these data elements. For example in some embodiments the authentication message may comprise an electronic signature over data related to the input value and a verifying entity may verify this electronic signature. In some embodiments the authentication message may comprise a MAC that the authentication device generated over data related to the input value using a symmetric cryptographic algorithm parameterized with a symmetric secret key, and a verifying entity may verify this MAC e.g. by generating a reference MAC over reference values of the data related to the input value using its own copy of the authentication device's secret key and compare this reference MAC to the MAC comprised in the authentication message. In some embodiments the verification of the data elements that are cryptographically related to the input value may be implicit. For example in some embodiments the authentication message may comprise data elements that are related to the input value that have been encrypted by the authentication device and the verifying entity may decrypt these encrypted data elements comprised in the authentication message and verification of these data elements may be implicitly done in subsequent verification steps of the authentication message wherein these decrypted data elements may be used. For example, in some embodiments the authentication message may comprise the encrypted input value or encrypted data elements that were used to generate the input value (e.g. a time value of real-time clock of the authentication device or a counter value of the authentication device) and the verifying entity may decrypt these data elements and use them to obtain a reference value for the input value that it then uses to verify the result of the asymmetric cryptographic operation comprised in the authentication message.

In some embodiments verifying data elements that are cryptographically related to the input value may prove to the verifying entity that a valid authentication device has been used to generate the input value. In some embodiments verifying data elements that are cryptographically related to the input value may prove to the verifying entity that a particular authentication device has been used to generate the input value. In some embodiments it may be a requirement for acceptance of the authentication message that the authentication message has been generated with a valid authentication device. In some embodiments it may be a requirement for acceptance of the authentication message for a particular user that the authentication message has been generated with a particular authentication device assigned to that particular user.

Verifying Data Elements that are Cryptographically Related to the Result of the Asymmetric Cryptographic Operation.

In some embodiments the authentication message may also comprise data elements that are cryptographically related to the result of the asymmetric cryptographic operation (i.e. that have been generated by the authentication device by cryptographically combining parts of the result of the asymmetric cryptographic operation with a secret data element), and verifying the authentication message may also comprise verifying these data elements.

In some embodiments the authentication device generates an electronic signature over (at least a part of) the result of the asymmetric cryptographic operation using a cryptographic algorithm parameterized with a secret key that may be stored in the authentication device and the authentication device includes this electronic signature in the authentication message and a verifying entity may verify this electronic signature.

In some embodiments the secret data element may for example be a secret (such as a symmetric cryptographic key) that is shared between the authentication device and the verifying entity (such as an authentication server), and verifying these data elements comprises the verifying entity using its copy of the secret data element with a cryptographic verification algorithm that is mathematically related to the cryptographic algorithm that was used to generate these data elements. For example in some embodiments these data elements may have been generated by the authentication device using a symmetric cryptographic algorithm parameterized with the secret data element and verifying these data elements may comprise a verifying entity generating a reference value for these data elements using the same symmetric cryptographic algorithm and a copy of the secret data element and comparing this reference value with the data elements that are cryptographically related to the result of the asymmetric cryptographic operation and that are comprised in the authentication message. For example in some embodiments the authentication message may also comprise a MAC over (a part of) the result of the asymmetric cryptographic operation which the authentication device may have generated using the secret data element (for example by using a MAC algorithm based on a symmetric cryptographic algorithm parameterized by the secret data element) and the verification of this MAC may comprise that the verifying entity generates a reference MAC value over the (the same part of) the result of the asymmetric cryptographic operation comprised in the authentication message using the same MAC algorithm and using its own copy of the secret data element and that the verifying entity compares this reference MAC value to the MAC comprised in the authentication message.

In some embodiments these data elements cryptographically related to the result of the asymmetric cryptographic operation may have been generated by the authentication device encrypting a part of the result of the asymmetric cryptographic operation and verifying these data elements may comprise the verifying entity decrypting them and comparing the decrypted parts with the corresponding parts of the result of the asymmetric cryptographic operation comprised in the authentication message.

In some embodiments these data elements cryptographically related to the result of the asymmetric cryptographic operation may comprise parts or the entirety of the result of the asymmetric cryptographic operation that have been encrypted by the authentication device and the verification of these data elements may be done implicitly by a verifying entity decrypting these parts to obtain the result of the asymmetric cryptographic operation and subsequently verifying the decrypted result of the asymmetric cryptographic operation as described above.

In some embodiments verifying data elements that are cryptographically related to the result of the asymmetric cryptographic operation may prove to the verifying entity that a valid authentication device has been used to generate the input value. In some embodiments verifying data elements that are cryptographically related to the result of the asymmetric cryptographic operation may prove to the verifying entity that a particular authentication device has been used to generate the result of the asymmetric cryptographic operation.

In some embodiments some or all of the steps to retrieve the authentication message from the captured pictures or movie and to verify the retrieved authentication message may be performed by the access device that the user uses to access an application. In some embodiments some or all of these steps may be performed by a computing device that is hosting the application that the user is accessing. This may for example comprise a remote application server that is accessed over a computer network by the user's access device. In some embodiments some or all of these steps may be performed by a separate authentication server that may be communicating (e.g. over a computer network) with the user's access device and/or with the computing device hosting the application.

In some embodiments the outcome of the verification of the authentication message may be used for example to authenticate the user, or to determine whether the user approved certain transaction data. This in turn may be used to decide whether or not to grant access to a user or to accept a particular transaction.

ADVANTAGEOUS EFFECTS

An important advantage of the present invention is that it allows securing a user's accessing an electronic application using security mechanisms based on asymmetric cryptography. More in particular, the invention allows the use of asymmetric cryptography to secure an application even if the user accesses the application by means of an access device that is not adapted or not suitable to communicate with the user's separate security device that contains the user's private key. For example if the user has a PKI smart card but accesses the application with a computer or smartphone that doesn't comprise a smart card reader and/or does not comprise a communication interface to connect a smart card and/or if it is inconvenient to install the software (e.g. drivers) on the access device to communicate with a smart card reader and the user's PKI smart card. The invention makes it for example possible for a remote application to obtain a digital signature over transaction data generated by a PKI smart card (such as for example an electronic national ID card, whereby the digital signature may be legally binding) when the user is accessing the application over a smartphone that has no smart card reader to communicate with the user's PKI smart card, but that has a camera. In some cases, e.g. if users may be assumed to already have a security device capable of asymmetric cryptographic operations (such as a PKI smart card) the invention enables securing users accessing an application without the need to distribute extra personalised security devices such as traditional strong authentication tokens and without a requirement for the users' access devices to be equipped with the hard- and software (e.g. smart card reader hardware connected to or embedded in the access devices and smart card drivers and cryptographic library software installed on the access devices) that is normally required for those access devices to interface with the users' security devices.

Another distinct advantage of some embodiments of the present invention is that they may allow the application to verify whether the result of the asymmetric cryptographic operation (such as a digital signature) has been generated using a secure device to interact with the user in the context of performing the asymmetric cryptographic operation.

More advantages of the present invention will be apparent to a person skilled in the art.

BRIEF DESCRIPTION OF THE DRAWINGS

The foregoing and other features and advantages of the invention will be apparent from the following, more particular description of several embodiments of the invention, as illustrated in the accompanying drawings.

The following description and the annexed drawings set forth in detail certain illustrative aspects of the claimed subject matter. These aspects are indicative, however, of but a few of the various ways in which the principles of the invention may be employed and the claimed subject matter is intended to include all such aspects and their equivalents. Other advantages and novel features of the claimed subject matter will become apparent from the following detailed description of the innovation when considered in conjunction with the drawings.

Figure 1:
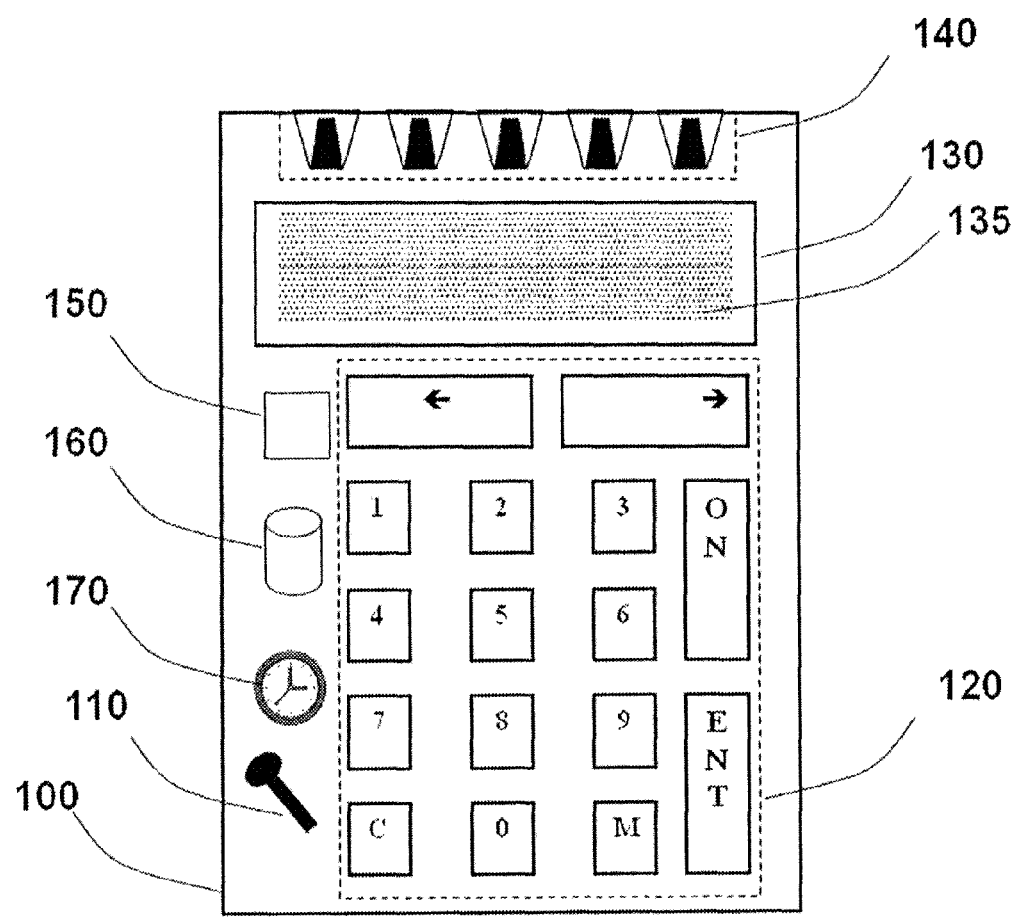

The detailed description set forth below in connection with the appended drawings is intended as a description of some embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the scope of the invention.

The claimed subject matter is described with reference to the drawings, wherein like reference numerals are used to refer to like elements throughout. In the following description, for purposes of explanation, numerous specific details are set forth in order to provide a thorough understanding of the invention. It may be evident, however, that the claimed subject matter may be practiced without these specific details. In other instances, well-known structures and devices are shown in block diagram form in order to facilitate describing the invention.

FIG. 1 schematically illustrates a device according to an aspect of the invention.

Figure 2:
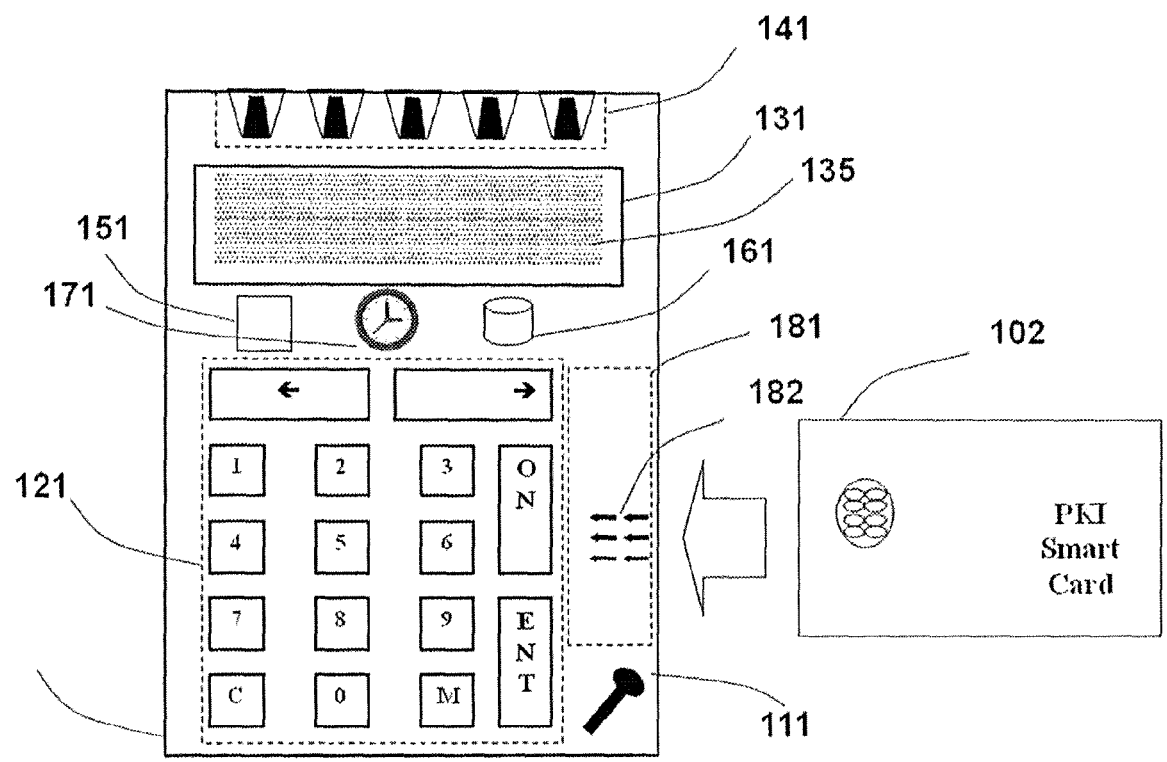

FIG. 2 schematically illustrates another device according to an aspect of the invention.

Figure 3:
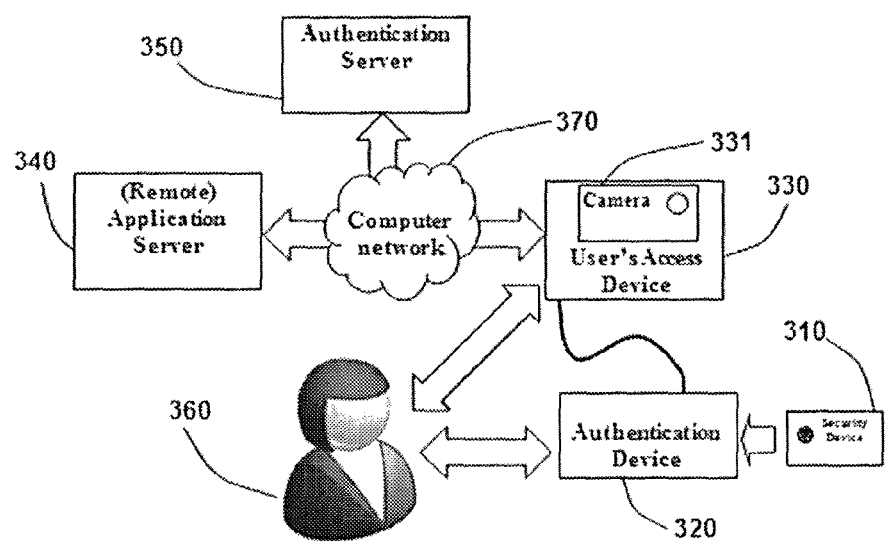

FIG. 3 schematically illustrates a system to secure transactions between a user and an application according to an aspect of the invention.

Figure 4:
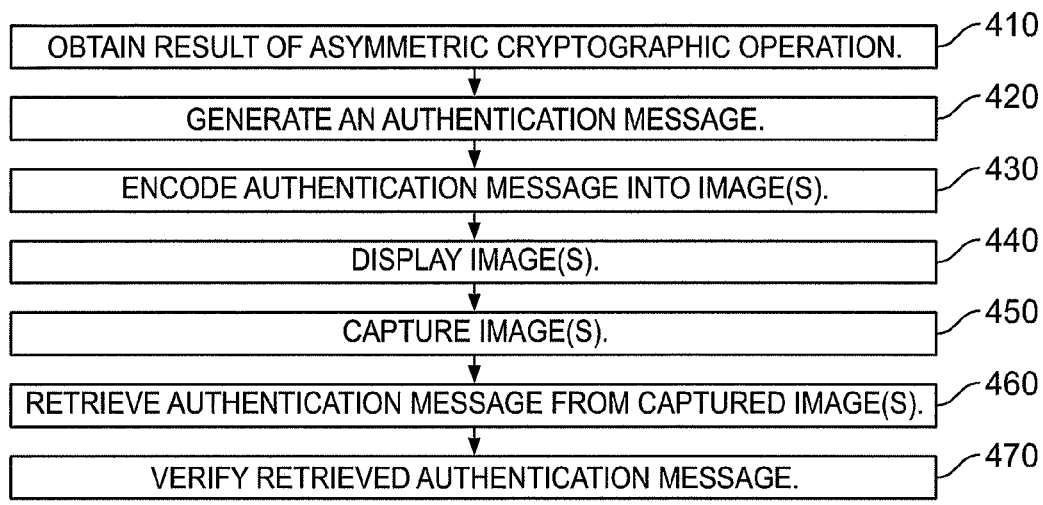

FIG. 4 schematically illustrates a method to secure transactions between a user and an application according to an aspect of the invention.

Figure 5A:
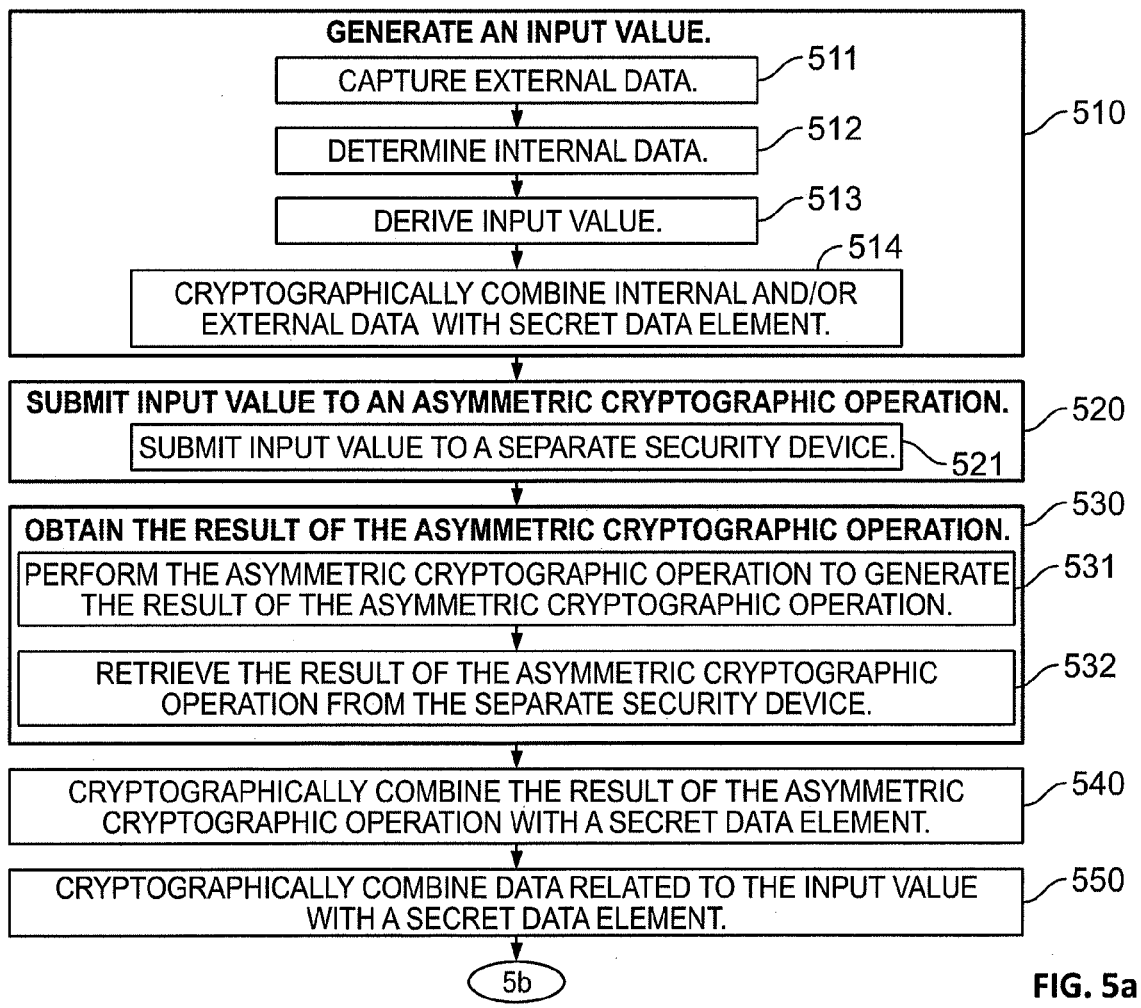
Figure 5B:
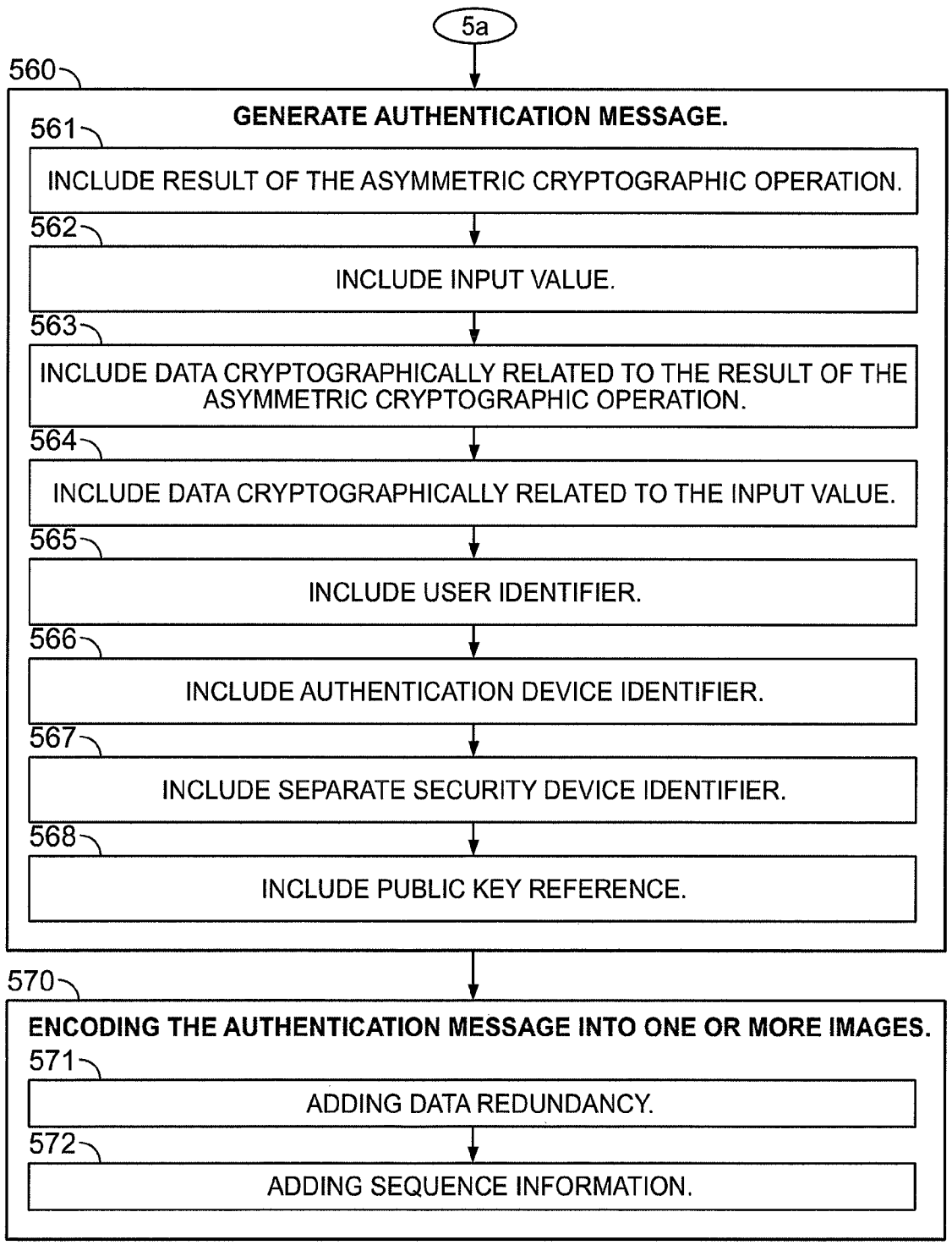

FIGS. 5a and 5b schematically illustrate a method according to an aspect of the invention to obtain, by an apparatus comprising an authentication device, the result of an asymmetric cryptographic operation and to generate, by the apparatus, an authentication message comprising this obtained result of an asymmetric cryptographic operation.

Figure 6:
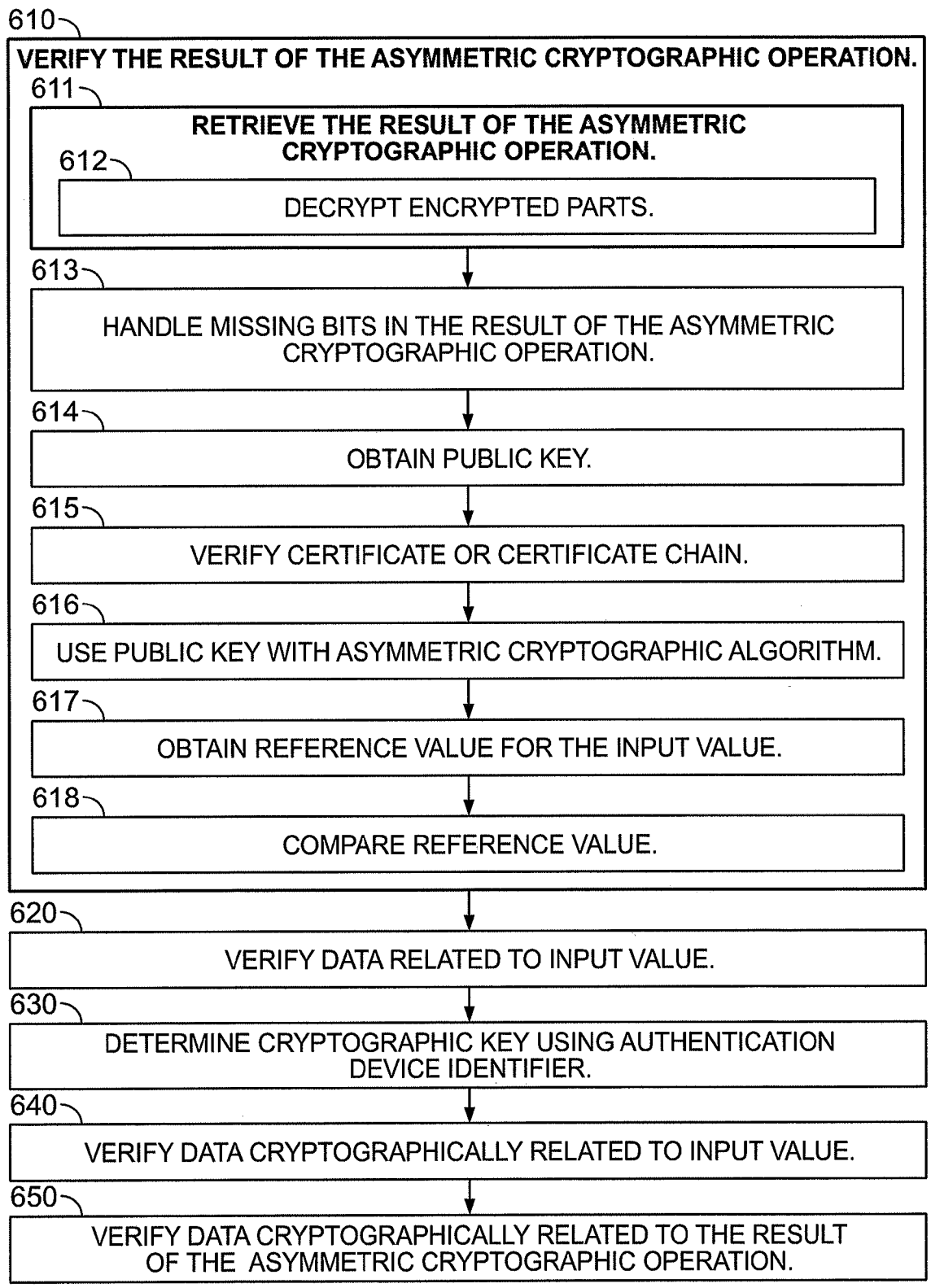

FIG. 6 schematically illustrates a method according to an aspect of the invention to verify the authentication message retrieved from one or more images displayed by an authentication device and comprising the result of an asymmetric cryptographic operation.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

FIG. 1 illustrates an authentication device (100) according to an aspect of the invention. The device comprises one or more data processing components (150), one or more memory components (160) and a display (130). Optionally, the device may comprise a real-time clock (170), an acoustic input interface (110), a manual user input interface (120), and/or an optical input interface (140). The device (100) is adapted to generate security values based on asymmetric cryptography and to encode these security values in one or more images (135) and to display these images on the display (130).

The one or more data processing components (150) may comprise a microcontroller and/or a microprocessor and/or a cryptographic coprocessor. The one or more data processing components (150) may comprise one or more processing components. These processing components may comprise microchips, integrated circuits, microcontrollers, microprocessors, FPGAs (Field-Programmable Gate Arrays), ASICs (Application Specific Integrated Circuits) and the like. The one or more data processing components (150) may comprise a component that is adapted to construct an input value. The input value may be derived from one or more of a time value provided by the real-time clock (170), a counter value maintained in memory (150), a challenge and/or certain transaction data values obtained through the acoustic input interface (110), the manual user input interface (120), and/or the optical input interface (140). The one or more data processing components (150) may comprise a component that is adapted to perform an asymmetric cryptographic operation on this input value according to an asymmetric cryptographic algorithm and using a private key of a public-private key pair to parameterize this asymmetric cryptographic algorithm. The one or more data processing components (150) may comprise a component that is adapted to generate a digital representation of the result of this asymmetric cryptographic operation, to encode this representation into one or more digital images (135) and to display these one or more images (135) on its display (130).

The display (130) may comprise a graphical display. It may comprise an LCD. In some embodiments it may comprise a touch screen. In some embodiments the display may have a resolution of minimally 1000 pixels. In some embodiments the display may have a resolution of minimally 2000 pixels. In some embodiments the display may be a black-and-white display. In some embodiments the display may be capable of displaying grey scales. In some embodiments the display may be a colour display.

The memory component (160) may comprise a non-volatile memory. The memory component (160) may comprise one or more memory components comprising RAM (possibly battery backed), ROM, EEPROM, flash memory or other types of memory components. The memory component (160) may comprise a secure tamper resistant memory. The memory component (160) may be adapted to store secret data such as a PIN or cryptographic keys. The memory component (160) may be adapted to store one or more private keys of a public-private key pair. The memory component (160) may be adapted to store one or more certificates or certificate chains associated with stored private keys. The memory component (160) may be adapted to store one or more symmetric cryptographic keys. The memory component (160) may be adapted to store one or more secret data elements. One or more of the secret data elements stored in memory component (160) may be shared with another entity such as for example an authentication server.

The manual user input interface (120) may be adapted to allow the user to enter information. The information entered by the user may comprise a PIN value, a challenge value, and/or values of certain transaction data.

FIG. 2 illustrates an authentication device (101) according to an aspect of the invention. The device comprises one or more data processing components (151), one or more memory components (161) and a display (131). The device (101) comprises a digital interface (182) to communicate with a second device (102) e.g. a separate security device.

Optionally, the device may comprise a real-time clock (171), an acoustic input interface (111), a manual user input interface (121), and/or an optical input interface (141). The device (101) is adapted to generate security values based on asymmetric cryptography and to encode these security values in one or more images (135) and to display these images on the display (131).

The one or more data processing components (151) may comprise a microcontroller and/or a microprocessor and/or a cryptographic coprocessor. The one or more data processing components (151) may comprise one or more processing components. These processing components may comprise microchips, integrated circuits, microcontrollers, microprocessors, FPGAs (Field-Programmable Gate Arrays), ASICs (Application Specific Integrated Circuits) and the like.

The one or more data processing components (151) may comprise a component that is adapted to construct an input value. The input value may be derived from one or more of a time value provided by the real-time clock (171), a counter value maintained in memory (151), a challenge and/or certain transaction data values obtained through the acoustic input interface (111), the manual user input interface (121), and/or the optical input interface (141). The one or more data processing components (151) may comprise a component that is adapted to submit the input value through interface (182) to a second device, e.g. a separate security device, that is adapted to perform an asymmetric cryptographic operation on this input value according to an asymmetric cryptographic algorithm and using a private key of a public-private key pair to parameterize this asymmetric cryptographic algorithm, and to obtain the result of this asymmetric cryptographic operation. The one or more data processing components (151) may comprise a component that is adapted to generate a digital representation of this result, to encode this representation into one or more digital images (135) and to display these one or more images (135) on its display (131).

In some embodiments the input value may be constructed using data elements provided by the second device. For example, in some embodiments the input value may be constructed using the value of a counter or a real-time clock in the second device. In some embodiments the input value may be constructed entirely or partly by the second device. In some embodiments the input value may be constructed by the second device using data elements that the second device obtains from the authentication device (101) through interface (182) such as for example a challenge (that may have been provided by the user) or transaction data (that may have been provided by the user). In some embodiments the input value may be constructed by the second device using only data elements that are internal to the second device such as the value(s) of a counter and/or a real-time clock comprised in the second device. In some embodiments the second device constructs the input value using a combination of data elements that the second device obtains from the authentication device (101) and data elements that are internal to the second device.

The display (131) may comprise a graphical display. It may comprise an LCD. In some embodiments it may comprise a touch screen. In some embodiments the display may have a resolution of minimally 1000 pixels. In some embodiments the display may have a resolution of minimally 2000 pixels. In some embodiments the display may be a black-and-white display. In some embodiments the display may be capable of displaying grey scales. In some embodiments the display may be a colour display.

The digital interface (182) may comprise a smart card interface.

The second device (102) may comprise a separate security device such as a smart card or a USB key. The separate security device may be a PKI smart card or may be a USB key comprising a smart card chip. In some embodiments the separate security device may store a private key of a public-private key pair. In some embodiments the separate security device may store a certificate and/or a public key of a public-private key pair. In some embodiments the separate security device may be adapted to perform asymmetric cryptographic operations with a private key stored on the separate security device. In some embodiments these asymmetric cryptographic operations may comprise generating digital signatures with the private key and/or encrypting or decrypting data with the private key. In some embodiments the separate security device may comprise a small size smart card (e.g. the size of a SIM (Subscriber Identity Module) card or the size of an ID-000 card as defined by ISO/IEC 7810) and the device (101) may comprise an internal slot for receiving the security device similar to the internal slots of mobile cell phones for receiving a SIM card. In some embodiments the separate security device may comprise a credit card sized smart card (e.g. an ID-1 sized smart card as defined by ISO/IEC 7810). In some embodiments the device (101) may comprise an externally accessible slot to allow convenient reception and removal of the separate security device. For example the device (101) may comprise an open smart card slot in which and from which the user can easily insert and withdraw a standard credit card sized smart card similar to the slots of common POS (point-of-sale) payment terminals.

The digital interface (182) may comprise hardware and software to communicate with the second device (102). For example the digital interface (182) may comprise drivers to exchange commands with the second device (102). For example the digital interface (182) may comprise drivers to exchange smart card APDUs (Application Protocol Data Unit) with a smart card or with a USB key comprising a smart card chip. In some embodiments the digital interface (182) may be adapted to support protocols and/or commands described in the ISO/IEC 7816 specifications. In some embodiments these commands may comprise commands to select an application on the security device, or to retrieve data from the security device, or to submit a PIN for verification by the security device, or to select a security environment, or to instruct the security device to perform a cryptographic operation such as an asymmetric cryptographic operation, or to generate a digital or electronic signature.

The memory component (161) may comprise a non-volatile memory. The memory component (161) may comprise one or more memory components comprising RAM (possibly battery backed), ROM, EEPROM, flash memory or other types of memory components. The memory component (161) may comprise a secure tamper resistant memory. The memory component (161) may be adapted to store secret data such as a PIN or cryptographic keys. The memory component (161) may be adapted to store one or more private keys of a public-private key pair. The memory component (161) may be adapted to store one or more certificates or certificate chains associated with stored private keys. The memory component (161) may be adapted to store one or more symmetric cryptographic keys. The memory component (161) may be adapted to store one or more secret data elements. One or more of the secret data elements stored in memory component (161) may be shared with another entity such as for example an authentication server.

The manual user input interface (121) may be adapted to allow the user to enter information. The information entered by the user may comprise a PIN value, a challenge value, and/or values of certain transaction data.

In some embodiments the authentication device (100 or 101), such as a device described in connection to FIG. 1 or 2 above, is a dedicated hardware device. In some embodiments the authentication device may be dedicated to be used in methods to secure a user's access to an application or to secure a user's interaction with such an application. In some embodiments the main goal of the authentication device is to be used in methods to secure a user's access to an application or to secure a user's interaction with such an application. In some embodiments, in order to guarantee the authentication device's dedication to its use as a security device, the authentication device may be adapted to make it impossible to alter its firmware. In some embodiments, in order to guarantee the authentication device's dedication to its use as a security device, any change to or update of its firmware is only possible through a secure firmware update protocol that is designed to ensure that only an authorised controlling trusted party can update or change the firmware of the authentication device. This enables the controlling trusted party to ensure that no firmware update happens which would undo the authentication device's dedication to its use in methods to secure a user's access to an application or to secure a user's interaction with such an application. A general purpose device with smart card reading capabilities but that is open in the sense that for example a user can update the software without authorisation of the controlling trusted party cannot be considered a dedicated device. Devices where the users can install extra software that is not authorized by a controlling trusted party cannot be considered dedicated devices. Devices the main purpose of which is to offer telecommunication facilities cannot be considered devices dedicated to be used in methods to secure a user's access to and interaction with an application. General purpose PCs, laptops, tablet computers and smartphones cannot be considered dedicated devices.

In some embodiments the authentication device (100 or 101), such as a device described in connection to FIG. 1 or 2 above, is a secure hardware device. In some embodiments the secure hardware device is adapted to ensure detection of and/or resist to attempts to tamper with the secure hardware device. In some embodiments the housing of the secure hardware device is adapted to resist to opening the housing and/or to increase the probability that a user will notice attempts to open the housing through deformation of the housing (tamper evidence). In some embodiments parts that together make up the housing may be welded or glued together so that attempts to detach these parts will typically lead to obvious deformation of the housing. In some embodiments the secure hardware device comprises a switch that detects opening of the housing. In some embodiments the secure hardware device is adapted to take appropriate action upon detecting an attempt to tamper. In some embodiments the secure hardware device may erase certain sensitive data such as cryptographic keys, or the secure hardware device may (possibly irreversibly) go into an error mode or cease to function upon detecting an attempt to tamper with the secure hardware device.

The secure hardware device may have a secure user output interface (e.g. a secure display) and a secure input interface (e.g. a secure keyboard). In some embodiments the secure hardware device has an output interface that is secure in that it is fully controlled by the secure hardware device and that it cannot be used to present data or information to a user by a process external to the secure hardware device unless that is authorized and controlled by the secure hardware device. In some embodiments the secure hardware device has a input interface that is secure in that it is fully controlled by the secure hardware device and that it cannot be used to obtain data or information from a user by a process external to the secure hardware device unless that is authorized and controlled by the secure hardware device. In some embodiments the security of the secure user input and output interfaces is maintained by the secure hardware device not allowing any change to its firmware or providing a secure firmware update mechanism that only allows changes to its firmware through a secure protocol that ensures that the secure hardware device accepts only authorised firmware updates from a trusted source.

In some embodiments the authentication device (100 or 101) may comprise an extra digital communication interface to communicate with a computing device such as for example the user's access device. This extra communication interface may for example comprise a USB interface and/or a wireless digital communication interface and/or an infrared interface. In some of these embodiments the authentication device may be adapted to also be able to function as a connected smart card reader (in some embodiments as a secure connected smart card reader). In some of these embodiments the authentication device may comprise a firewall to screen commands coming in through the extra digital communication interface and block or let pass such incoming commands depending on certain security related criteria.

In some embodiments, to ensure security, the authentication device (100 or 101) has no such extra digital communication interface. In some embodiments, to ensure security, the only input interface that allows inputting user data into the authentication device is a manual user input interface.

In some embodiments the reader has a weight and spatial measures such that the authentication device can be considered to be a portable hand-held device. In some embodiments the reader has a weight and spatial measures such that the authentication device can be sent to the user through mail at moderate costs. For example in some embodiments the authentication device may have a thickness of less than 2 cm, a width of less than 10 cm, a length of less than 15 cm, and a weight of less than 200 grams. In other embodiments the authentication device may have a thickness of less than 1.5 cm, a width of less than 7 cm, a length of less than 13 cm, and a weight of less than 110 grams. In some embodiments the length and width of the authentication device may exceed the length respectively the width of a standard full size credit card by no more than 10 percent. In some embodiments the authentication device may have the length and width of a standard full size credit card. In some embodiments the authentication device may have the length, width and thickness of a standard full size credit card within the margins applicable for standard full size credit cards (e.g. having the dimensions of an ID-1 sized smart card as specified by ISO/IEC 7810).

In some embodiments the authentication device comprises an autonomous power source. In some embodiments the power source may comprise a battery. In some embodiments the battery may be replaceable.

In some embodiments the authentication device may support EMV (Europay-Mastercard-VISA) smart cards and may support or be compatible with the CAP (Chip Authentication Protocol) specifications.

According to an aspect of the invention an apparatus is provided that comprises an authentication device and a separate security device such as for example an authentication device and separate security device as described in connection to FIG. 2.

FIG. 3 illustrates a system to secure transactions between a user (360) and an application according to an aspect of the invention. The system comprises an authentication device (320) and an access device (330). The system may further comprise an application host (340). The system may also comprise an authentication server (350). The system may also comprise a separate security device (310).

The authentication device (320) may comprise one of the authentication devices (100, 101) described in connection to FIGS. 1 and 2. The authentication device (320) has a display for displaying images. The authentication device (320) has a user interface to interact with a user. The authentication device (320) may have a communication interface to communicate with for example a separate security device (310). The authentication device (320) is adapted to generate an authentication message using a method according to an aspect of the invention. This method may for example comprise the method described in connection to FIG. 5. The authentication device (320) is adapted to display one or more images encoding the authentication message.

The access device (330) may for example comprise a computing device, such as a laptop or a smartphone or a tablet computer, that the user (360) may use to access the application. The access device (330) may comprise a user interface to interact with the user (360). The access device (330) may for example comprise a touch screen, or a display and keyboard and/or a mouse. The access device (330) comprises an optical input device (331) for capturing images or movies such as a (digital) camera or CCD (Charged Coupled Device). In some embodiments the access device may comprise a communication interface to connect the access device to a computer network (370) such as the Internet. In some embodiments the access device is connected through a computer network (370) to other computing devices such as for example an application host computer (340) and/or an authentication server (350).

The application host computer (340) comprises a computing device that hosts at least a part of the application that the user (360) is accessing. The application host computer (340) may comprise a remote application server that is connected to the access device over a computer network (370) such as the internet. In some embodiments the application host computer may also be connected to an authentication server (350). In some embodiments the application host computer (340) may be adapted to perform one or more steps of a method according to an aspect of the invention to secure the user's access to the application. In some embodiments this method may comprise the methods described in connection to FIG. 4 and/or FIG. 6. In some embodiments the application may be web based and the application host computer may comprise a web server.

In some embodiments the application that the user accesses may comprise a remote financial application such as for example an internet banking application. In some embodiments the application may be an e-government application, for example an application allowing users to submit a tax declaration over the internet.

FIG. 4 illustrates a method to secure transactions between a user and an application. The method comprises the steps of: obtaining (410), by an apparatus comprising an authentication device (such as for example one of the authentication devices described above), the result of an asymmetric cryptographic operation; generating (420), by the apparatus, an authentication message comprising this obtained result of an asymmetric cryptographic operation; encoding (430), by the apparatus, the authentication message into one or more images; displaying (440), by the apparatus, the one or more images on a display of the authentication device; capturing (450) by an access device the one or more images displayed on the authentication device's display; retrieving (460) from the captured one or more images the encoded authentication message; and verifying (470) the retrieved authentication message.

More details on the steps of the method illustrated in FIG. 4 may be found in the preceding paragraphs disclosing the invention.

FIGS. 5a and 5b illustrate a method to obtain, by an apparatus comprising an authentication device (such as for example one of the authentication devices described above), the result of an asymmetric cryptographic operation and to generate, by the apparatus, an authentication message comprising this obtained result of an asymmetric cryptographic operation. The method may comprise the steps of: generating (510) an input value; submitting (520) the generated input value to an asymmetric cryptographic operation that uses a an asymmetric cryptographic algorithm and a private key of a public-private key pair; obtaining (530) the result of the asymmetric cryptographic operation; (optionally) cryptographically combining (540) the result of the asymmetric cryptographic operation with a secret data element to obtain data elements cryptographically related to the result of the asymmetric cryptographic operation; (optionally) cryptographically combining (550) data related to the input value with a secret data element to obtain data elements cryptographically related the input value; generating (560) an authentication message; and encoding (570) the authentication message in one or more images.

The step of generating (510) an input value may comprise the following sub steps: (optionally) capturing (511) one or more external data elements such as for example a challenge or transaction data; (optionally) determining (512) one or more internal data elements such as for example a time value of a real-time clock or a counter value; deriving (513) an input value from these external and/or internal data elements; and (optionally) cryptographically combining (514) some of these external and/or internal data elements with a secret data element.

The step of submitting (520) the generated input value to an asymmetric cryptographic operation may comprise the (optional) sub step of submitting (521) the input value (or a precursor value of the input value) to a separate security device.

The step of obtaining (530) the result of the asymmetric cryptographic operation may comprise the following sub steps: generating (531) the result of the asymmetric cryptographic operation by performing the asymmetric cryptographic operation (by the authentication device itself or by the separate security device) and (optionally) retrieving (532) the result of the asymmetric cryptographic operation from the separate security device.

The step of generating (560) an authentication message may comprise the following sub steps: including (561) in the authentication message the result of the asymmetric cryptographic operation; (optionally) including (562) in the authentication message the input value; (optionally) including (563) in the authentication message data elements cryptographically related to the result of the asymmetric cryptographic operation; (optionally) including (564) in the authentication message data elements cryptographically related to the input value; (optionally) including (565) in the authentication message a data element indicative of the user identity; (optionally) including (566) in the authentication message a data element identifying the authentication device; (optionally) including (567) in the authentication message a data element identifying the separate security device; and (optionally) including (568) in the authentication message a public key reference data element that may be used to identify or retrieve the public key corresponding to the private key used to generate the result of the asymmetric cryptographic operation and/or that may be used to identify or retrieve a certificate or certificate chain associated with this public key.

The step of encoding (570) the authentication message in one or more images may comprise the following sub steps: (optionally) adding (571) data redundancy and (optionally) adding (572) sequence information.

More details on the steps and sub steps of the method illustrated in FIG. 5 may be found in the preceding paragraphs disclosing the invention.

FIG. 6 illustrates a method to verify the authentication message retrieved from one or more images displayed by an authentication device and comprising the result of an asymmetric cryptographic operation. The method may comprise the steps of: verifying (610) the result of the asymmetric cryptographic operation using an asymmetric cryptographic algorithm with a public key that corresponds to the private key that was used to generate the result of the asymmetric cryptographic operation; (optionally) verifying (620) data related to the input value; (optionally) using (630) a data element in the authentication message that is related to the identity of the authentication device to determine the value of a cryptographic key; (optionally) verifying (640) data elements that are cryptographically related to the input value, whereby in some embodiments a cryptographic key is used that is determined in step 630; (optionally) verifying (650) data elements that are cryptographically related to the result of the asymmetric cryptographic operation, whereby in some embodiments a cryptographic key is used that is determined in step 630.

The step of verifying (610) the result of the asymmetric cryptographic operation may comprise the following sub-steps: retrieving (611) the result of the asymmetric cryptographic operation from the authentication message, which in turn may (optionally) comprise decrypting (612) encrypted parts of the result of the asymmetric cryptographic operation in the authentication message; (optionally) handling (613) missing bits in the retrieved result of the asymmetric cryptographic operation; obtaining (614) the public key that corresponds to the private key that was used to generate the result of the asymmetric cryptographic operation; (optionally) verifying (615) a certificate or certificate chain associated with the public key; using (616) the public key and the result of the asymmetric cryptographic operation with an asymmetric cryptographic algorithm; (optionally) obtaining (617) a reference value for the input value that was used to generate the result of the asymmetric cryptographic operation; (optionally) using (618) the reference value e.g. by comparing the reference value with a value obtained by using the public key and the result of the asymmetric cryptographic operation with an asymmetric cryptographic algorithm.

More details on the steps and sub steps of the method illustrated in FIG. 6 may be found in the preceding paragraphs disclosing the invention.

Order of the Steps of the Methods.

In one embodiment some steps of the methods discussed above happen in the following order: first the input value is generated (510); then the input value is submitted (520) to the asymmetric cryptographic operation; then the result of the asymmetric cryptographic operation is obtained (410, 530); then the authentication message is generated (420, 560); then the authentication message is encoded (430, 570) into one or more images; then the one or more images are displayed (440)

on the display of the authentication device. In some embodiments after the input value is generated (510) and before the authentication message is generated (420, 560) the authentication device may (optionally) generate other data elements such as data elements cryptographically related to the result of the asymmetric cryptographic operation (540) and data elements cryptographically related to the input value (550).

In another embodiment some steps of the methods discussed above happen in the following order: first an authentication device displays one or more images encoding an authentication message generated as described above, then the one or more images are captured by the optical image capturing device (e.g. a camera) of the access device, then the one or more images are decoded to obtain the authentication message, then the result of the asymmetric cryptographic operation is retrieved from the authentication message, then the result of the asymmetric cryptographic operation is retrieved. In some embodiments a challenge is generated and provided to the user before the authentication device generates an authentication message and displays the authentication message encoded into one or more images.

In one embodiment various aspects of the invention are used as follows to secure e.g. an internet banking application.

A user accesses a remote application such as an internet banking website over the internet using a web browser on the user's access device (e.g. the user's PC or smartphone).

The user obtains access as follows. The user takes an authentication device and inserts his or her personal PKI smart card (which may e.g. be an electronic national ID card or a card issued by the bank) in the authentication device. The authentication device generates an input value. In some cases the application generates a challenge and prompts the user to enter the challenge into the authentication device. In some cases the authentication device determines a time value derived from its real-time clock. The authentication device determines the input value using this challenge and/or time value. The authentication device requests the user to enter the smart card's PIN and submits the PIN to the smart card for verification. Upon successful PIN verification the authentication device sends the input value to the inserted PKI smart card and instructs the smart cart to generate a digital signature over the input value. The smart card generates a digital signature over the input value using standard PKI mechanisms to generate a digital signature with a private key associated with the user that is securely stored in the smart card. The authentication device receives the digital signature from the smart card. The authentication device also receives the user's certificate for the user's private key from the smart card and extracts the certificate's serial number from the certificate. The authentication device generates a one-time password using an OTP generating algorithm based on a symmetric encryption algorithm parameterized with a unique symmetric secret encryption key securely stored in the authentication device. The authentication device uses as inputs for the OTP algorithm the challenge and/or time value and a part of the digital signature obtained from the smart card. The authentication device assembles in an authentication message the following data: the digital signature generated by the smart card, the generated OTP, (if applicable) the time value, the certificate's serial number, and the authentication device's serial number. The authentication device encodes the authentication message into a single image which in some cases may have the form of black-and-white bitmap. The authentication device displays the image on its display. The user holds the authentication device's display in front of the access device's camera until the application indicates that the image has successfully been captured.

The application captures the image displayed on the authentication device's display and decodes the image to obtain the authentication message. The application extracts the various date elements that make up the authentication message. The application server uses the certificate serial number to retrieve the certificate and the public key in a central database containing the certificates and public keys of the users. The application extracts the user's identity from the certificate data and determines the user's user ID. In some cases the application uses the authentication device's serial number to verify whether this particular authentication device has been assigned to this particular user. In other cases the application verifies whether this particular authentication device has not been blacklisted (e.g. because it is known or suspected to have been compromised). The application forwards to an authentication server the following data elements: the OTP retrieved from the authentication message, the authentication device's serial number retrieved from the authentication message, (if applicable) the challenge that it provided to the user, (if applicable) the time value retrieved from the authentication message retrieved from the authentication message, the applicable bits of the digital signature retrieved from the authentication message that were used in the generation of the OTP. The authentication server derives a copy of the authentication device's unique symmetric secret encryption key from a master key and the authentication device's serial number and uses the derived copy value of the encryption key and the data received from the application server to verify the OTP value and returns the verification result to the application server. The application server verifies (if applicable) whether the time value is within predefined tolerance margins of the current time. The application server uses the challenge and/or time value to determine a reference value for the input value. The application server uses the reference value for the input value and the retrieved public key to verify the digital signature retrieved from the authentication message. If all verifications are successful the application server grants the user access.

The user now submits a transaction to the application server. For example the user instructs the application to perform a transfer of a certain amount of money from the user's account to another account. This transaction is secured as follows. The application prompts the user to use the authentication device's keyboard to provide the amount of money and the destination account number to the authentication device. In some cases, to prevent replay attacks the user is also presented with a challenge to provide to the authentication device. Additionally or alternatively the authentication device determines a time value of its real-time clock. The authentication device now generates an authentication message in substantially the same way as for the log-in except that now the authentication device uses a combination of the transaction data and (if applicable) the challenge provided by the user instead of just the challenge to generate the input value, the OTP and the digital signature. The authentication message comprising the digital signature generated by the smart card, the generated OTP, (if applicable) the time value, the certificate's serial number, and the authentication device's serial number is encoded by the authentication device into an image that is displayed on the authentication device's display. The user holds the authentication device's display in front of the access device's camera until the application indicates that the image has successfully been captured. The image is captured and decoded by the application and the various data elements making up the authentication message are retrieved from the authentication message. The application server verifies the authentication message in substantially the same way as the log-in authentication message except that now the application and authentication server now use a combination of the transaction data and (if applicable) the challenge instead of just the challenge to verify the OTP and the digital signature. I.e. the application server forwards to the authentication server the following data elements: the OTP retrieved from the authentication message, the authentication device's serial number retrieved from the authentication message, the transaction data, (if applicable) the challenge that it provided to the user, (if applicable) the time value retrieved from the authentication message, and the applicable bits of the digital signature retrieved from the authentication message (i.e. the bits that were used to generate the OTP) whereupon the authentication server verifies the OTP value. The application server also uses the transaction data, the challenge and/or time value to determine a reference value for the input value. The application server uses the reference value for the input value and the retrieved public key to verify the digital signature retrieved from the authentication message. A successful verification of the OTP indicates that the authentication device identified by the device identifier in the authentication message was used to generate the OTP and the result of the asymmetric cryptographic operation. A successful verification of the digital signature indicates that the user indeed approves the transaction data. If all verifications are successful the application server performs the requested transaction.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. For example, modules or components need not perform all, or any, of the functionality attributed to that module in the implementations described above, and all or part of the functionality attributed to one module or component may be performed by another module or component, another additional module or component, or not performed at all. Accordingly, other implementations are within the scope of the appended claims.

In addition, while a particular feature of the present invention may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments but should be defined only in accordance with the following claims and their equivalents.

The invention claimed is:

1. A portable handheld dedicated authentication device for securing access of a remotely accessible application by a user, the dedicated authentication device comprising:
   a smart card interface comprising an externally accessible open smart card slot for receiving from the user a removable standard credit card sized Public Key Infrastructure (PKI) smart card having an associated Personal Identification Number (PIN) and adapted to perform an asymmetric cryptographic operation, said smart card interface further comprising drivers to exchange smart card Application Protocol Data Units (APDUs) with the PKI smart card when received and adapted to support PIN verification commands;
   a manual user input interface configured to receive the PIN from the user;
   firmware;
   a display;
   at least one data processing component adapted to:
   request the user to enter the PIN associated with the PKI smart card;
   submit the entered PIN to the PKI smart card when received via the smart card interface for verification by the PKI smart card;
   generate an input value;
   submit the input value to the PKI smart card via the smart card interface to perform said asymmetric cryptographic operation, said asymmetric cryptographic operation generating a result based on an asymmetric cryptographic algorithm parameterized by a first private key of a public-private key pair, the first private key stored by the PKI smart card and the result comprising a digital signature over said input value;
   obtain said result of said asymmetric cryptographic operation from the PKI smart card via said smart card interface;
   generate an authentication message substantially comprising said obtained result of said asymmetric cryptographic operation;
   encode said authentication message into one or more images;
   display said one or more images on said display; and
   ensure that any change of the firmware is either not possible or is only possible through a secure firmware update protocol that enables only an authorized controlling trusted party to change the firmware.

2. The authentication device of claim 1 further comprising a data input interface adapted to receive at least one variable data element that is external to the authentication device and wherein the input value is generated using said at least one external variable data element.

3. The authentication device of claim 2 wherein said data input interface comprises a keyboard.

4. The authentication device of claim 2 wherein said data input interface comprises an optical data input interface.

5. The authentication device of claim 2 wherein said data input interface comprises an acoustical data input interface.

6. The authentication device of claim 2 wherein said at least one external variable data element comprises a challenge.

7. The authentication device of claim 2 wherein said at least one external variable data element comprises transaction data.

8. The authentication device of claim 1 further adapted to generate said input value using at least one variable data element that is internal to the authentication device.

9. The authentication device of claim 8 further comprising a real-time clock and wherein said at least one internal variable data element comprises a time value provided by said real-time clock.

10. The authentication device of claim 9 further comprising a counter and wherein said at least one internal variable data element comprises a counter value provided by said counter.

11. The authentication device of claim 1 further adapted to include data related to said input value in said authentication message.

12. The authentication device of claim 11 wherein said data related to said input value comprises the input value.

13. The authentication device of claim 1 further comprising a secure data storage component wherein said secure data storage component stores a secret data element.

14. The authentication device of claim 13 further adapted to generate data cryptographically related to said input value by cryptographically combining a first cryptographic key with data related to said input value and to include said generated data cryptographically related to said input value in said authentication message wherein said first cryptographic key is comprised in or derived from said secret data element.

15. The authentication device of claim 14 wherein said first cryptographic key comprises a symmetric cryptographic key that is shared with a verifying entity and wherein said cryptographically combining is done using a symmetric cryptographic algorithm.

16. The authentication device of claim 14 wherein said first cryptographic key comprises an asymmetric cryptographic key and wherein said cryptographically combining is done using an asymmetric cryptographic algorithm.

17. The authentication device of claim 14 wherein said first cryptographic key comprises an encryption key and wherein said cryptographically combining comprises encrypting said data related to said input value using an encryption algorithm.

18. The authentication device of claim 13 further adapted to generate data cryptographically related to said result of said asymmetric cryptographic operation by cryptographically combining a second cryptographic key with at least a part of said result of said asymmetric cryptographic operation and to include said generated data cryptographically related to said result of said asymmetric cryptographic operation in said authentication message and wherein said second cryptographic key is comprised in or derived from said secret data element.

19. The authentication device of claim 18 wherein said second cryptographic key comprises a symmetric cryptographic key that is shared with a verifying entity and wherein said cryptographically combining is done using a symmetric cryptographic algorithm.

20. The authentication device of claim 18 wherein said second cryptographic key comprises an asymmetric cryptographic key and wherein said cryptographically combining is done using an asymmetric cryptographic algorithm.

21. The authentication device of claim 18 wherein said second cryptographic key comprises an encryption key and wherein said cryptographically combining comprises encrypting at least a part of said result of said asymmetric cryptographic operation using an encryption algorithm.

22. The authentication device of claim 1 further adapted to include in said authentication message a reference to the public key corresponding to said first private key.

23. The authentication device of claim 1 further adapted to include in said authentication message a data element to identify the authentication device.

24. The authentication device of claim 1 further adapted to include in said authentication message a data element to identify the user.

25. The authentication device of claim 1 further adapted to include in said authentication message a data element to identify said PKI smart card.

26. A method for securing computer-based applications being remotely accessed by at least one user comprising the steps of:
    capturing one or more images displayed on the display of a portable handheld dedicated authentication device of said at least one user whereby said one or more images have been encoded with an authentication message generated by said authentication device and whereby said authentication message comprises the result of an asymmetric cryptographic operation on an input value submitted by said authentication device to a removable standard credit card sized Public Key Infrastructure (PKI) smart card of said at least one user received in a smart card interface of the authentication device to perform the asymmetric cryptographic operation based on an asymmetric cryptographic algorithm parameterized by a first private key of a public-private key pair, said first private key stored by said PKI smart card;
    decoding said one or more images to retrieve said authentication message;
    retrieving said result of said asymmetric cryptographic operation from said authentication message; and
    verifying said authentication message;
    wherein verifying said authentication message comprises verifying said retrieved result of said asymmetric cryptographic operation using an asymmetric cryptographic algorithm parameterized with a public key of the public-private key pair, said public key corresponding to said first private key; and
    wherein said result of said asymmetric cryptographic operation comprises a digital signature over said input value generated with a digital signature generation algorithm based on asymmetric cryptography and parameterized with said first private key and wherein verifying said retrieved result of said asymmetric cryptographic operation comprises verifying said digital signature using a digital signature verification algorithm based on asymmetric cryptography and parameterized with said public key.

27. The method of claim 26 further comprising obtaining the value of said public key by using data comprised in said authentication message.

28. The method of claim 27 wherein said authentication message further comprises a data element identifying said at least one user and wherein said user identifying data element is used to obtain the value of said public key.

29. The method of claim 27 wherein said authentication message further comprises a data element identifying the device that performed said asymmetric cryptographic operation and wherein said device identifying data element is used to obtain the value of said public key.

30. The method of claim 26 wherein said authentication message further comprises data related to said input value and wherein verifying said authentication message further comprises verifying said data related to said input value.

31. The method of claim 26 wherein said authentication message further comprises data elements that are cryptographically related to said input value and wherein verifying said authentication message comprises cryptographically verifying said data elements that are cryptographically related to said input value.

32. The method of claim 31 wherein said authentication message further comprises a data element identifying said authentication device; wherein the method further comprises the step of obtaining the value of a first cryptographic key using said authentication device identifying data element; and wherein cryptographically verifying said data elements that are cryptographically related to said input value comprises using a cryptographic algorithm parameterized with said first cryptographic key.

33. The method of claim 26 wherein said authentication message further comprises data elements that are cryptographically related to said result of said asymmetric cryptographic operation and wherein verifying said authentication message comprises cryptographically verifying said data elements that are cryptographically related to said result of said asymmetric cryptographic operation.

34. The method of claim 33 wherein said authentication message further comprises a data element identifying said authentication device; wherein the method further comprises the step of obtaining the value of a second cryptographic key using said authentication device identifying data element; and wherein cryptographically verifying said data elements that are cryptographically related to said result of said asymmetric cryptographic operation comprises using a cryptographic algorithm parameterized with said second cryptographic key.

35. The method of claim 26 wherein said result of said asymmetric cryptographic operation comprised in said authentication message comprises at least one encrypted part and wherein retrieving said result of said asymmetric cryptographic operation from said authentication message comprises decrypting said at least one encrypted part.

36. The method of claim 35 wherein said authentication message further comprises a data element identifying said authentication device; wherein the method further comprises the step of obtaining the value of a third cryptographic key using said authentication device identifying data element; and wherein said decrypting of said at least one encrypted part comprises using a decryption algorithm parameterized with said third cryptographic key.

* * * * *